United States Patent
Vacon et al.

(10) Patent No.: US 12,088,352 B2
(45) Date of Patent: Sep. 10, 2024

(54) METHOD AND SYSTEM FOR IDENTIFYING ENTANGLED PHOTONS WITHOUT CLASSICAL INFORMATION SHARING

(71) Applicant: Qubit Moving and Storage, LLC, Franconia, NH (US)

(72) Inventors: Gary Vacon, East Falmouth, MA (US); Kristin A. Rauschenbach, Franconia, NH (US)

(73) Assignee: Qubit Moving and Storage, LLC, Franconia, NH (US)

( * ) Notice: Subject to any disclaimer, the term of this patent is extended or adjusted under 35 U.S.C. 154(b) by 0 days.

(21) Appl. No.: 18/167,589

(22) Filed: Feb. 10, 2023

(65) Prior Publication Data
US 2023/0324527 A1    Oct. 12, 2023

Related U.S. Application Data

(60) Provisional application No. 63/327,892, filed on Apr. 6, 2022.

(51) Int. Cl.
| | |
|---|---|
| H04B 10/00 | (2013.01) |
| G01S 7/00 | (2006.01) |
| G01S 7/4865 | (2020.01) |
| G06N 10/40 | (2022.01) |
| H04B 10/70 | (2013.01) |
| G06N 10/00 | (2022.01) |

(52) U.S. Cl.
CPC ............ H04B 10/70 (2013.01); G01S 7/4865 (2013.01); G06N 10/40 (2022.01); *G06N 10/00* (2019.01)

(58) Field of Classification Search
USPC ....................................................... 356/5.01
See application file for complete search history.

(56) References Cited

U.S. PATENT DOCUMENTS

| | | |
|---|---|---|
| 5,418,905 A | 5/1995 | Rarity et al. |
| 6,028,935 A | 2/2000 | Rarity et al. |

(Continued)

FOREIGN PATENT DOCUMENTS

| | | | |
|---|---|---|---|
| CN | 109415201 A | * 3/2019 | ............ B82Y 10/00 |
| CN | 109586907 A | 4/2019 | |

(Continued)

OTHER PUBLICATIONS

Karlsson et al., "Quantum teleportation using three-particle entanglement", Physical Review A, vol. 58, No. 6, Dec. 1998, pp. 4394-4400.

(Continued)

*Primary Examiner* — James R Hulka
(74) *Attorney, Agent, or Firm* — Rauschenbach Patent Law Group, PLLC; Kurt Rauschenbach

(57) ABSTRACT

A method and system for identifying entangled photons includes generating a plurality of sets of four entangled photons, wherein a first pair of photons in each of the plurality of sets of four entangled photons are time correlated indicating that a second pair of photons in a same one of each of the plurality of sets of four entangled photons are time correlated. A coincidence time of a first pair of photons of each of the plurality of sets of four entangled photons is determined and coincidence times are recorded as a first quantum data set. A coincidence time of a second pair of photons of each of the plurality of sets of four entangled photons determined and coincidence times is recorded as a second quantum data set such that the first quantum data set and the second quantum data set comprise at least some correlated coincidence times.

20 Claims, 12 Drawing Sheets

(56) References Cited

U.S. PATENT DOCUMENTS

| | | | |
|---|---|---|---|
| 6,609,139 B1 | 8/2003 | Dultz et al. | |
| 7,028,275 B1 | 4/2006 | Chen et al. | |
| 7,072,432 B2 | 7/2006 | Belcea | |
| 7,242,774 B1 | 7/2007 | Elliott et al. | |
| 7,286,444 B1 | 10/2007 | Bahder et al. | |
| 7,581,100 B2 | 8/2009 | Mizrah | |
| 7,684,015 B2 | 3/2010 | Shih | |
| 7,812,303 B2 | 10/2010 | Meyers et al. | |
| 7,847,234 B2 | 12/2010 | Meyers et al. | |
| 8,053,715 B2 | 11/2011 | Meyers et al. | |
| 8,204,231 B2 * | 6/2012 | Maeda | H04L 9/0891 380/279 |
| 8,242,428 B2 | 8/2012 | Meyers et al. | |
| 8,269,978 B2 | 9/2012 | Capron et al. | |
| 8,373,107 B2 | 2/2013 | Meyers et al. | |
| 8,525,149 B2 | 9/2013 | Stevenson et al. | |
| 8,611,535 B2 | 12/2013 | Brodsky et al. | |
| 8,890,049 B2 | 11/2014 | Yuan et al. | |
| 8,983,303 B2 | 3/2015 | Meyers et al. | |
| 9,064,315 B2 | 6/2015 | Meyers et al. | |
| 9,131,128 B2 | 9/2015 | Meyers et al. | |
| 9,270,385 B2 | 2/2016 | Meyers et al. | |
| 9,331,843 B2 | 5/2016 | Silverman et al. | |
| 9,473,301 B2 | 10/2016 | Englund et al. | |
| 9,727,959 B2 | 8/2017 | Meyers et al. | |
| 9,934,469 B1 | 4/2018 | Jau et al. | |
| 10,110,378 B2 * | 10/2018 | Han | H04L 9/0852 |
| 10,541,809 B2 | 1/2020 | Godfrey et al. | |
| 10,564,933 B2 | 2/2020 | Nordholt et al. | |
| 10,595,102 B2 | 3/2020 | Brodsky et al. | |
| 10,790,913 B2 | 9/2020 | Henningsen et al. | |
| 10,931,376 B2 * | 2/2021 | Beattie, Jr. | H04B 10/6161 |
| 10,992,391 B1 | 4/2021 | Meyers et al. | |
| 11,050,559 B2 * | 6/2021 | Bucklew | H04L 9/0858 |
| 11,193,750 B1 | 12/2021 | Fertig et al. | |
| 11,251,952 B2 | 2/2022 | Lamas-Linares et al. | |
| 11,268,806 B2 | 3/2022 | Fertig et al. | |
| 11,290,181 B1 | 3/2022 | Meyers et al. | |
| 11,367,014 B2 | 4/2022 | Vacon et al. | |
| 11,411,658 B1 | 8/2022 | Vacon et al. | |
| 11,431,418 B2 | 8/2022 | Rauschenbach et al. | |
| 11,507,874 B2 | 11/2022 | Vacon et al. | |
| 11,610,147 B2 | 3/2023 | Vacon et al. | |
| 11,614,771 B2 | 3/2023 | Vacon et al. | |
| 11,616,644 B2 | 3/2023 | Vacon et al. | |
| 11,728,902 B1 | 8/2023 | Meyers et al. | |
| 11,829,847 B2 | 11/2023 | Vacon et al. | |
| 11,933,608 B2 * | 3/2024 | Vacon | G01B 9/02091 |
| 2002/0191176 A1 * | 12/2002 | Saleh | H04B 10/2569 356/73.1 |
| 2004/0095582 A1 | 5/2004 | Holbrook | |
| 2004/0208638 A1 | 10/2004 | Jansen | |
| 2004/0258421 A1 | 12/2004 | Conti et al. | |
| 2005/0100351 A1 | 5/2005 | Yuan et al. | |
| 2005/0135620 A1 | 6/2005 | Kastella et al. | |
| 2005/0199812 A1 | 9/2005 | Shih | |
| 2006/0115086 A1 | 6/2006 | Beausoleil et al. | |
| 2007/0101410 A1 | 5/2007 | Harrison et al. | |
| 2008/0059712 A1 | 3/2008 | Fedorova | |
| 2008/0180222 A1 | 7/2008 | Hollister et al. | |
| 2009/0147955 A1 | 6/2009 | Kim et al. | |
| 2009/0194702 A1 | 8/2009 | Meyers et al. | |
| 2009/0290162 A1 | 11/2009 | Erkmen et al. | |
| 2009/0316910 A1 | 12/2009 | Maeda et al. | |
| 2012/0051755 A1 * | 3/2012 | Arahira | H04B 10/70 398/158 |
| 2012/0294625 A1 | 11/2012 | Dynes et al. | |
| 2013/0176573 A1 | 7/2013 | Bovino | |
| 2014/0112478 A1 * | 4/2014 | Arahira | H04L 9/0852 380/278 |
| 2015/0055961 A1 * | 2/2015 | Meyers | G06N 10/00 398/140 |
| 2016/0028544 A1 | 1/2016 | Hyde et al. | |
| 2016/0041032 A1 | 2/2016 | Matthews et al. | |
| 2016/0112066 A1 | 4/2016 | Ashikhmin | |
| 2016/0164615 A1 | 6/2016 | Dailey et al. | |
| 2016/0191173 A1 | 6/2016 | Malaney | |
| 2016/0234017 A1 | 8/2016 | Englund et al. | |
| 2017/0099139 A1 | 4/2017 | Han et al. | |
| 2017/0364796 A1 | 12/2017 | Wiebe et al. | |
| 2018/0152295 A1 * | 5/2018 | Drost | H04L 9/0858 |
| 2018/0232649 A1 | 8/2018 | Wiebe et al. | |
| 2018/0239592 A1 | 8/2018 | Nordholt et al. | |
| 2019/0103962 A1 | 4/2019 | Howe et al. | |
| 2019/0376820 A1 | 12/2019 | Jones et al. | |
| 2020/0044749 A1 | 2/2020 | Rauschenbach et al. | |
| 2020/0084033 A1 | 3/2020 | Lamas-Linares et al. | |
| 2020/0183250 A1 | 6/2020 | Hall et al. | |
| 2020/0233645 A1 | 7/2020 | Nordholt et al. | |
| 2020/0274703 A1 | 8/2020 | Lukens et al. | |
| 2020/0313879 A1 | 10/2020 | Hong et al. | |
| 2020/0334101 A1 | 10/2020 | Albert et al. | |
| 2020/0350990 A1 | 11/2020 | Beattie, Jr. et al. | |
| 2020/0374211 A1 | 11/2020 | Griffin et al. | |
| 2020/0379171 A1 | 12/2020 | Li et al. | |
| 2020/0382219 A1 | 12/2020 | Innes et al. | |
| 2021/0105135 A1 | 4/2021 | Figueroa et al. | |
| 2021/0116639 A1 | 4/2021 | Fertig et al. | |
| 2021/0124640 A1 | 4/2021 | Nickerson et al. | |
| 2021/0132969 A1 | 5/2021 | Smith | |
| 2021/0133614 A1 | 5/2021 | Ashrafi | |
| 2021/0152346 A1 | 5/2021 | Bucklew et al. | |
| 2021/0273731 A1 | 9/2021 | Zhang et al. | |
| 2021/0295196 A1 | 9/2021 | Gimeno-Segovia et al. | |
| 2021/0296558 A1 | 9/2021 | Englund et al. | |
| 2021/0325605 A1 | 10/2021 | Rudolph et al. | |
| 2022/0019409 A1 | 1/2022 | Bhardwaj et al. | |
| 2022/0043128 A1 | 2/2022 | Pacala et al. | |
| 2022/0069152 A1 | 3/2022 | Tosi et al. | |
| 2022/0084085 A1 | 3/2022 | Rigetti et al. | |
| 2022/0085985 A1 | 3/2022 | Kaplan | |
| 2022/0114471 A1 | 4/2022 | Vacon et al. | |
| 2022/0214713 A1 | 7/2022 | Vacon et al. | |
| 2022/0309375 A1 | 9/2022 | Vacon et al. | |
| 2022/0353068 A1 | 11/2022 | Vacon et al. | |
| 2023/0058994 A1 | 2/2023 | Vacon et al. | |
| 2023/0177375 A1 | 6/2023 | Vacon et al. | |
| 2023/0185330 A1 | 6/2023 | Vacon et al. | |
| 2023/0216670 A1 | 7/2023 | Vacon et al. | |
| 2023/0327778 A1 | 10/2023 | Vacon et al. | |
| 2023/0327779 A1 | 10/2023 | Vacon et al. | |
| 2023/0336336 A1 | 10/2023 | Vacon et al. | |
| 2023/0375327 A1 | 11/2023 | Vacon et al. | |

FOREIGN PATENT DOCUMENTS

| | | | | |
|---|---|---|---|---|
| EP | 3771137 A1 * | 1/2021 | | H04B 10/70 |
| JP | 6060737 B2 | 1/2017 | | |
| JP | 6708062 B2 | 6/2020 | | |
| KR | 10-2021-0154364 A | 12/2021 | | |
| WO | 2020/140850 A1 | 7/2020 | | |
| WO | 2020/180672 A1 | 9/2020 | | |
| WO | 2020/232546 A1 | 11/2020 | | |
| WO | WO-2021013990 A1 * | 1/2021 | | H04B 10/70 |
| WO | 2021/171248 A1 | 9/2021 | | |
| WO | 2021/262322 A1 | 12/2021 | | |
| WO | 2022/140011 A2 | 6/2022 | | |
| WO | 2022/159902 A1 | 7/2022 | | |
| WO | 2023/196749 A1 | 10/2023 | | |
| WO | 2023/224658 A2 | 11/2023 | | |
| WO | 2023/225456 A1 | 11/2023 | | |
| WO | 2024/006713 A1 | 1/2024 | | |

OTHER PUBLICATIONS

Treiber et al., "A fully automated entanglement-based quantum cryptography system for telecom fiber networks", New Journal of Physics, vol. 11, Apr. 30, 2009, 20 pages.

Pfaff et al., "Unconditional quantum teleportation between distant solid-state quantum bits", Quantum Information, vol. 345, No. 6196, Aug. 1, 2014, pp. 532-535.

Rizzi et al., "White Rabbit Clock Synchronization: Ultimate Limits on Close-In Phase Noise and Short-Term Stability Due to FPGA Implementation", IEEE Transactions on Ultrasonics, Ferroelectrics, and Frequency Control, vol. 65, No. 3, Sep. 2018, pp. 1726-1737.

Mkacher et al., "Calibrating NTP", IEEE, 2019, 6 pages.

Chapman et al., "Hyperentangled Time-bin and Polarization Quantum Key Distribution", arXiv:1908.09018v3, 2020, 39 pages.

Mandel, L., "Proposal for almost noise-free optical communication under conditions of high background", J. Opt. Soc. Am. B, vol. 1, No. 1, Mar. 1984, pp. 108-110.

Ursin et al., "Quantum teleportation across the Danube", Nature, vol. 430, Aug. 19, 2004, pp. 849.

Ilo-Okeke et al., "Remote quantum clock synchronization without synchronized clocks", Npj Quantum Information, 2018, 5 pages.

Resch et al., "Distributing entanglement and single photons through an intra-city, free-space quantum channel", Optics Express, vol. 13, No. 1, Jan. 10, 2005, pp. 202-209.

Jennewein et al., "Quantum Cryptography with Entangled Photons", Physical Review Letters, vol. 84, No. 20, May 15, 2000, pp. 4729-4732.

Using coincidence correlation for studying quantum optic systems, Piqoquant GMBH, Jun. 1, 2018, 6 pages.

Time in distributed systems: clocks and ordering of events, Indian Institute of Technology Kharagpur, Department of computer Science and Engineering, 38 pages.

Time in distributed systems, University of Cambridge, Cambridge, UK, 20 pages.

Giovannetti et al., "Limits to clock synchronization induced by completely dephasing communication channels", Physical Review A, Jun. 17, 2002, vol. 65, 062319-1-062319-6.

Bennett et al., "Quantum cryptography: public key distribution and coin tossing," Theoretical Computer Science Theoretical Aspects of Quantum Cryptography, 2014, vol. 560, Part 1, pp. 7-11.

Kiesel et al., "Experimental Analysis of a Four-Qubit Photon Cluster State", Physical Review Letters, vol. 95, 210502, Nov. 18, 2005, pp. 1-4.

Aull et al., "Geiger-Mode Avalanche Pholodiodes for Three-Dimensional Imaging", Lincoln Laboratory Journal, vol. 13, No. 2, 2002, pp. 335-350.

Avalanche Pholodiodes: A User's Guide, PerkinElmer, 2003, 8 pages.

Oh, J., et al., "Coincidence Rates for Photon Pairs in WDM Environment", Journal of Lightwave Technology, vol. 29, No. 3, Feb. 1, 2011, pp. 324-329.

Grieve et al.,"Correcting for accidental correlations in saturated avalanche photodiodes", Optics Express, vol. 24, No. 4, Feb. 22, 2016, pp. 3592-3600.

Guo et al.,"Tesling the Bell inequality on frequency-bin entangled photon pairs using lime-resolved detection", Optica, vol. 4, No. 4, Apr. 2017, pp. 388-392.

Lee et al., "Temporal Multiplexing of Heralded Single Photon Sources Using Optical Fiber Delays", Korea Institute of Science and Technology Information—Korea Research Institute of Standards and Science, 2020, 3 pages.

Shi et al., "Breakdown flash at telecom wavelengths in InGaAs avalanche photodiodes", Optics Express, vol. 25, No. 24, Nov. 27, 2017, pp. 30388-30394.

Wengerowskya et al., Entanglement distribution over a 96-km-long submarine optical fiber, PNAS, vol. 116, No. 14, Apr. 2, 2019, pp. 684-6688.

Bhandari et al., "Low-Cost Coincidence-Counting Electronics for Quantum Optics", Department of Physics, 2007, 2 pages.

Gentry et al., "Quantum-correlated photon pairs generated in a commercial 45 nm complementary metal-Oxide semiconductor microelectronic chip", Optica, vol. 2, No. 12, Dec. 2015, pp. 1065-1071.

Rarity et al., "Single-photon counting for the 1300-1600-nm range by use of Peltier-cooled and passively quenched nGaAs avalanche photodiodes", Applied Optics, vol. 39, No. 36, Dec. 20, 2000, pp. 6746-6753.

Park et al., "High-performance reconfigurable coincidence counting unit based on a field programmable gate array", applied optics, vol. 54, No. 15, May 20, 2015, pp. 4727-4731.

Boso et al., "Low-cost and compact single-photon counter based on a CMOS SPAD smart pixel", IEEE Photonics technology Letters, vol. 27, No. 23, Dec. 1, 2015, 4 pages.

Unternahrer et al., "Coincidence Detection of Spatially Correlated Photon Pairs with a Novel Type of Monolithic time- Resolving Detector Array", IEEE, 2017, 1 page.

Unternahrer et al., "Coincidence detection of spatially correlated photon pairs with a monolithic time-resolving detector array", Optics Express, vol. 24, No. 15, Dec. 12, 2016, pp. 28829-28841.

Hong et al., "Measurement of Subpicosecond Time Intervals between Two Photons by Interference," Physical Review Letters, vol. 59, No. 18, 2044, Nov. 2, 1987, pp. 1-3.

Achatz et al., "High-dimensional EPR entanglement from a SPDC source at telecom wavelength", arXiv: Quantum Physics, 2021, pp. 1-7.

Bauerle et al. "Coherent control of single electrons: a review of current progress", Rep. Prog. Phys., vol. 81, 056503, Apr. 5, 2018, 33 pages.

Chen et al., "Experimental demonstration of conjugate-Franson interferometry", Research Laboratory of Electronics, Massachusetts Institute of Technology, Cambridge, MA 02139 , USA, May 3, 2021, pp. 1-7.

Chen et al., "Supplemental Material for Experimental Demonstration of Conjugate-Franson Interferometry, Research Laboratory of Electronics", Massachusetts Institute of Technology, Cambridge, MA 02139, May 3, 2021, pp. 1-4.

Erkmen et al.,"Ghost imaging: from quantum to classical to computational", Advances in Optics and Photonics, vol. 2, 2010, pp. 405-450.

International Search Report and Written Opinion received for corresponding PCT Application No. PCT/ US2023/065072, mailed on Jul. 13, 2023, 15 pages.

Jin et al., "Long-range distribution of high-quality time-bin entangled photons for quantum communication", Journal of the Korean Physical Society, vol. 80, Dec. 2021, pp. 203-213.

Shapiro et al., "Classical Imaging with Undetected Photons" Scientific Reports, vol. 5, No. 10329, 2015, pp. 1-8.

Tittel et al., "Long-distance Bell-type tests using energy-time entangled photons", University of Geneva, Group of Applied Physics, 20, Rue de l'Ecole de Med'ecine, CH-1211 Geneva 4, Switzerland, Nov. 4, 2018, pp. 1-22.

Shapiro et al., "On-demand single-photon generation using a modular array of parametric down converters with electro-optic polarization controls," Opt. Lett., vol. 32, 2007, 2698-2700.

Wang, et al., "On-Demand Semiconductor Source of Entangled Photons Which Simultaneously Has High Fidelity, Efficiency, and Indistinguishability", Physical Review Letters, vol. 122, 113602, 2019, 6 pages.

Muller, et al., "On-demand generation of indistinguishable polarization-entangled photon pairs," URL: https://arxiv.org/ftp/arxiv/papers/1308/1308.4257.pdf, Aug. 21, 2013, 5 pages.

Clemmen, et al., "All-optically tunable buffer for single photons", Optics Letters, vol. 43, No. 9, Apr. 27, 2018, pp. 2138-2141.

Heshami et al., "Quantum memories: Emerging Applications and Recent Advances," Journal of modern optics, vol. 63, No. 20, 2016, pp. 2005-2028.

Cho, et al., "Highly efficient optical quantum memory with long coherence time in cold atoms", Optica, vol. 3, No. 1, Jan. 15, 2016, pp. 100-107.

Nunn et al., "Enhancing multiphoton rates with quantum memories", Centre for Quantum Technologies, Sep. 9, 2018, 5 pages.

Hamel et al., "Direct generation of three-photon polarization entanglement", Institute for Quantum Computing and Department of Physics & Astronomy, Apr. 28, 2014, 9 pages.

Mattle et al., "Dense Coding in Experimental Quantum Communication", Physical Review Letters, Jun. 17, 1996, vol. 76, No. 25, , pp. 4656-4659.

Chen et al., "Heralded Quantum Random Access Memory in a Scalable Photonic Integrated Circuit Platform", Optical Society of America, 2021, 2 pages.

Ball et al., "Quantum firmware and the quantum computing stack", Physics Today, Mar. 2021, vol. 74, No. 3, , pp. 28-34.

Kaczmarek et al., "A Noiseless Quantum Optical Memory at Room Temperature", Frontiers in Optics, 2017, 2 pages.
Li et al., "Quantum Supremacy Circuit Simulation on Sunway TaihuLight", URL:https://arxiv.org/pdf/1804.04797.pdf Aug. 13, 2018, pp. 1-11.
Zhang et al., "Examples on quantum search algorithm with optimized depth", Dec. 11, 2019, pp. 1-7.
Kanamori et al., "Three-party Quantum Authenticated Key Distribution with Partially Trusted Third Party", IEEE Global Telecommunications Conference, IEEE, 2008, 5 pages.
Weihs et al., "Violation of Bell's inequality under strict Einstein locality conditions", Physical Review Letters, vol. 81, No. 23, Dec. 7, 1998, pp. 5039-5043.
Smith et al., "Quantifying Coherence and Entanglement via Simple Measurements", arXiv:1707.09928v1, Jul. 31, 2017, 9 pages.
Ding et al., "The Cross-Correlation of Binary Sequences With Optimal Autocorrelation", IEEE Transactions On Information Theory, 2010, vol. 56, No. 4, Apr. 2010, pp. 1694-1701.
Shrivastav et al., "Globally Synchronized Time via Datacenter Networks", IEEE/ACM Transactions On Networking, Aug. 2019, vol. 27, No. 4, Aug. 2019, pp. 1401-1416.
Peloso et al., "Daylight operation of a free space, entanglement-based quantum key distribution system", New Journal of Physics 11, 2009, 13 pages.
Brunner et al., "Detection loophole in asymmetric Bell experiments", PRL 98, 220403, 2007, pp. 220403-1-220403-4.
Meyer-Scott et al., "Single-photon sources: Approaching the ideal through multiplexing", Review of Scientific Instruments, 2020, vol. 91, No. 4, 2020, pp. 041101-1-041101-18.
Saleh et al., "Towards spontaneous parametric down conversion from monolayer MoS2", Scientific Reports, vol. 8, No. 3862, 2018, 7 pages.
Fanto et al., "Multipli-entangled photons from a spontaneous parametric down-conversion source", Quantum Information and Computation, vol. 8057, 2011, pp. 805705-1-805705-12.
Ilic, Nikolina, "The Ekert Protocol", Journal of Physics, 334, Jul. 22, 2007, 4 pages.
Haider et al., "Entangling Independent Photons by Time Measurement", Nature Physics, vol. 3, Oct. 2007, pp. 692-695.
Zhuang et al., "Entanglement-Enhanced Lidars for Simultaneous Range and Velocity Measurements." Physical Review A, vol. 96, No. 4, Oct. 2017, pp. 040304-1-040304-6.
Guccione et al., "Connecting heterogeneous quantum networks by hybrid entanglement swapping", Sci. Adv., vol. 6, No. 22, 2020, pp. 1-6.
Gisin, Nicolas, "Entanglement 25 Years after Quantum Teleportation: Testing Joint Measurements in Quantum Networks", Entropy, vol. 21, 2019, pp. 1-12.
Anderson, Brian P., "Field Guide to Quantum Mechanics", SPIE Field Guides, vol. FG44, 2019, 152 pages.
Arrazola et al., "Quantum Fingerprinting with Coherent States and a Constant Mean Number of Photons", Physical Review A 89, 2014, pp. 062305-1-062305-6.
Kwiat et al., "New High-Intensity Source of Polarization-Entangled Photon Pairs", Physical Review Letters, vol. 75, No. 24, Dec. 11, 1995, pp. 4337-4341.
Zhao et al., "Experimental Demonstration of Five-photon Entanglement and Open-destination Teleportation", Nature, vol. 430, Jul. 2004, 19 pages.
Morrison et al., "High dimensional frequency-bin entanglement from domain engineered parametric downconversion", FM1N.1, Cleo, 2021, 2 pages.
Kashi et al., "Enabling Scalability of Photonic Frequency-Domain Quantum Processing", FM1N.4, Cleo 2021, 2 pages.
Chang et al., "Quantification of High-dimensional Energy-time Entanglement in a Biphoton Frequency Comb", FM3M.6, Cleo 2021, 2 pages.
Sloan et al., "Two photon emission from superluminal and accelerating index changes", FM3N.4, Cleo 2021, 2 pages.
Kviatkovsky et al., "Microscopy with undetected photons in the mid-infrared", FTh20.5, Cleo 2021, 2 pages.
Goswami, Abhirup, "Analysis of a Deterministic Entangled Photon Pair Source using Single Photons", Sep. 2016, 79 pages.
Haroche, Serge, "Entanglement, Decoherence And The Quantum/Classical Boundary", Physics Today, vol. 51, Jul. 1998, pp. 36-42.
Brunner et al., "Bell nonlocality", Reviews of Modern Physics, vol. 86, 2014, pp. 419-478.
Merkouche et al., "Multiple pulse-mode Bell states heralded via entanglement swapping", JM4E.6, Cleo 2021, 2 pages.
Lee, Catherine, "High-Dimensional Quantum Communication Deployed Fiber", Feb. 2018, 143 pages.
Hu et al., "Beating the channel capacity limit for superdense coding with entangled ququarts", Science Advances, vol. 4 , Jul. 20, 2018, pp. 1-5.
Luo et al., "High-Reliability Sub-Nanosecond Network Time Synchronization Method Enabled by Double-Frequency Distributed Time Synchronization", Journal of Optical Communications and Networking, vol. 11, No. 1, Jan. 2019, pp. A40-A51.
Xie et al., "A High-Precision 2.5-ps RMS Time Synchronization for Multiple High-Speed Transceivers in FPGA", IEEE Transactions On Nuclear Science, vol. 66, No. 7, Jul. 2019, pp. 1070-1075.
Goswami et al., "Indefinite causal order in a quantum switch", Physical Review Letters, vol. 121, 2018, pp. 090503-1-090503-5.
Galvez, Enrique J., "Correlated-Photon Experiments Laboratory Manual", Colgate University, 2008, 27 pages.
Chen et al., "Joint Time and Frequency Dissemination Network Over Delay-Stabilized Fiber Optic Links", IEEE Photonics Journal, vol. 7, No. 3, Jun. 2015, 10 pages.
Sulimany et al., "All-Fiber Source and Sorter for Multimode Correlated Photons", JTh3A.17, Cleo 2021, 2 pages.
Suprano et al., "Detection techniques for Orbital Angular Momentum states", JTh3A.59, Cleo 2021, 2 pages.
Placke et al., "Engineering AlGaAs-on-insulator towards quantum optical applications", JTu3A.20, Cleo 2021, 2 pages.
Kavuri et al., "Quantum state tomography at the Tsirelson bound", JTu3A.45, Cleo 2021, 2 pages.
Devetak et al., "Distillation of secret key and entanglement from quantum states", Proceedings of the Royal Society A, vol. 461, 2004, pp. 207-235.
Rangarajan et al., "Optimizing type-I polarization-entangled photons", Optics Express, vol. 17, No. 21, Oct. 12, 2009, pp. 18920-18933.
Strekalov et al., "Postselection-free energy-time entanglement", Physical Review A, Third Series, vol. 54, No. 1, Jul. 1996, pp. R1-R4.
Kaneda et al.,"Heralded single-photon source utilizing highly nondegenerate, spectrally factorable spontaneous parametric downconversion", Optics Express, vol. 24, No. 10, May 16, 2016, pp. 10733-10747.
Zielnicki, Kevin, "Pure Sources And Efficient Detectors For Optical Quantum Information Processing", 2014, 104 pages.
Lesovik et al., "Arrow of time and its reversal on the IBM quantum computer", Scientific Reports, 2019, vol. 9, No. 4396, 2019, 8 pages.
Ursin et al. "Entanglement-based quantum communication over 144 km", Nature Physics, vol. 3, Jul. 2007, pp. 481-486.
Giovannetti et al., "Quantum-enhanced positioning and clock synchronization", Nature, vol. 412, Jul. 26, 2001, 16 pages.
Hong et al., "Optical communication channel based on coincident photon pairs", Applied Optics, vol. 24, No. 22, Nov. 15, 1985, pp. 3877-3882.
Matsukevich et al., "Bell Inequality Violation with Two Remote Atomic Qubits", Physical Review Letters, vol. 100, Apr. 18, 2008, pp. 150404-1-150404-4.
Kong et al., "Implementation of Multiparty quantum clock synchronization", arXiv:1708.06050v2, 2017, 6 pages.
Venkatasubramanian, Nalini, "Time in distributed Systems", 66 pages.
Kim et al., "Delayed "Choice" Quantum Eraser", Physical Review Letters, vol. 84, No. 1, Jan. 3, 2000, 5 pages.
Butner et al., "Nanosecond-scale Event Synchronization over Local-area Networks", Proceedings of the 27th Annual IEEE Conference on Local Computer Networks, 2021, 9 pages.
Wittje, Roland, "Noise: From nuisance to research subject", Physics Today 73, Feb. 2020, pp. 8 pages.

Quan et al., "Nonlocal temporal correlation identification of entangled photon pairs for quantum clock synchronization", 10 pages.

Boughn, Stephen, "Making Sense of Bell's Theorem and Quantum Nonlocality", Found Physics, 2017, 18 pages.

D'Ambrosio et al., "Complete experimental toolbox for alignment-free quantum communication", Nature communications, vol. 3, 2012, 8 pages.

Altepeter et al., "Phase-compensated ultra-bright source of entangled photons", Optics Express, vol. 13, No. 22, Oct. 31, 2005, pp. 8951-8959.

Martin et al., "Quantifying Photonic High-Dimensional Entanglement", vol. 118, issue 11, Mar. 17, 2017, pp. 110501-1-110501-5.

Das et al., "Robust quantum network architectures and topologies for entanglement distribution", Physical Review A 97, 2018, pp. 012335-1-012335-12.

Ekert, Artur K., "Quantum Cryptography Based on Bell's Theorem", Physical Review Letters, vol. 67, No. 6, Aug. 5, 1991, pp. 661-663.

Bennett et al., "Teleporting an Unknown Quantum State via Dual Classical and Einstein-Podolsky-Rosen Channels", Physical Review Letters, vol. 70, No. 13, Mar. 29, 1993, pp. 1895-1899.

Bennett et al., "Entanglement-Assisted Classical Capacity of Noisy Quantum Channels", Physical Review Letters, vol. 83, No. 15, Oct. 11, 1999, pp. 3081-3084.

Lloyd et al., "Long Distance, Unconditional Teleportation of Atomic States via Complete Bell State Measurements", Physical Review Letters, vol. 87, No. 16, Oct. 15, 2001, pp. 167903-1-167903-4.

Jozsa et al., "Quantum Clock Synchronization Based on Shared Prior Entanglement", Physical Review Letters, vol. 85, No. 9, Aug. 28, 2000, pp. 2010-2013.

Bennett et al., "Purification of Noisy Entanglement and Faithful Teleportation via Noisy Channels", vol. 76, No. 5, Jan. 29, 1996, pp. 722-725.

Shi et al., "Privacy-preserving Quantum Sealed-bid Auction Based on Grover's Search Algorithm", Scientific Reports, vol. 9, 2019, pp. 1-10.

Demirel et al., "Correlations for computation and computation for correlations", Nature Partner Journals, vol. 7, 2021, pp. 1-8.

Gogo et al., "Comparing quantum and classical correlations in a quantum eraser", Physical Review A, vol. 71, 2005, pp. 052103-1-052103-6.

Agam et al., "Shot Noise In Chaotic Systems: "Classical" to Quantum Crossover", Physical Review Letters, vol. 85, No. 15, Oct. 9, 2000, pp. 3153-3156.

Stipcevic, Mario, "Quantum random No. generators and their applications in cryptography", Proc. of SPIE, vol. 8375, 2012, pp. 837504-1-837504-15.

Quan et al., "Demonstration of quantum synchronization based on second-order quantum coherence of entangled photons", Scientific Reports, vol. 6, 2016, pp. 1-8.

Bedington et al., "Progress in satellite quantum key distribution", Quantum Information, vol. 3, 2017, pp. 1-13.

Nolleke et al., "Efficient Teleportation Between Remote Single-Atom Quantum Memories", Physical Review Letters, vol. 110, Apr. 5, 2013, pp. 140403-1-140403-5.

Jung et al., "Remote Laser-Microwave Synchronization Over Kilometer-Scale Fiber Link With Few-Femtosecond Drift" Journal of Lightwave Technology, vol. 32, No. 20, Oct. 15, 2014, pp. 3742-3748.

Pant et al., Routing entanglement in the quantum internet, arXiv:1708.07142v2, Sep. 22, 2017, 13 pages.

Leung et al., "Deterministic bidirectional communication and remote entanglement generation between superconducting qubits", npj Quantum Information, vol. 5, 2019, 5 pages.

Kemparaj et al., "Secure precision time protocol in packet switched networks", IEEE, 2019, 6 pages.

Shih, Yanhua, "The physics of ghost imaging", Optical Society of America, 32 pages.

Mahmood et al., "Delay and Jitter Characterization for Software-Based Clock Synchronization Over WLAN Using PTP", IEEE Transactions on Industrial Informatics, vol. 10, No. 2, 2014, May 2014, pp. 1198-1206.

Paesani et al., "Generation and sampling of quantum states of light in a silicon chip", Nature Physics, 2018, 27 pages.

Joly et al., "Fibre-based pressure-controlled sources for quantum optics", STh1A.5, Cleo 2021, 2 pages.

Simon et al., "High-capacity quantum key distribution via hyperentangled degrees of freedom", New Journal of Physics, vol. 16, Jun. 24, 2014, 21 pages.

Shen et al., "Classically Entangled Vectorial Structured Light towards Multiple Degrees of Freedom and Higher Dimensions", STh1B.1, Cleo 2021, 2 pages.

Seijo et al., "Enhanced Timestamping Method for Sub-Nanosecond Time Synchronization in IEEE 802.11 over WLAN Standard Conditions", IEEE Transactions on Industrial Informatics, vol. 16, No. 9, Sep. 2020, pp. 5792-5805.

Liu et al., "General scheme for superdense coding between multiparties", Physical Review A, vol. 65, 2002, pp. 022304-1-022304-4.

\* cited by examiner

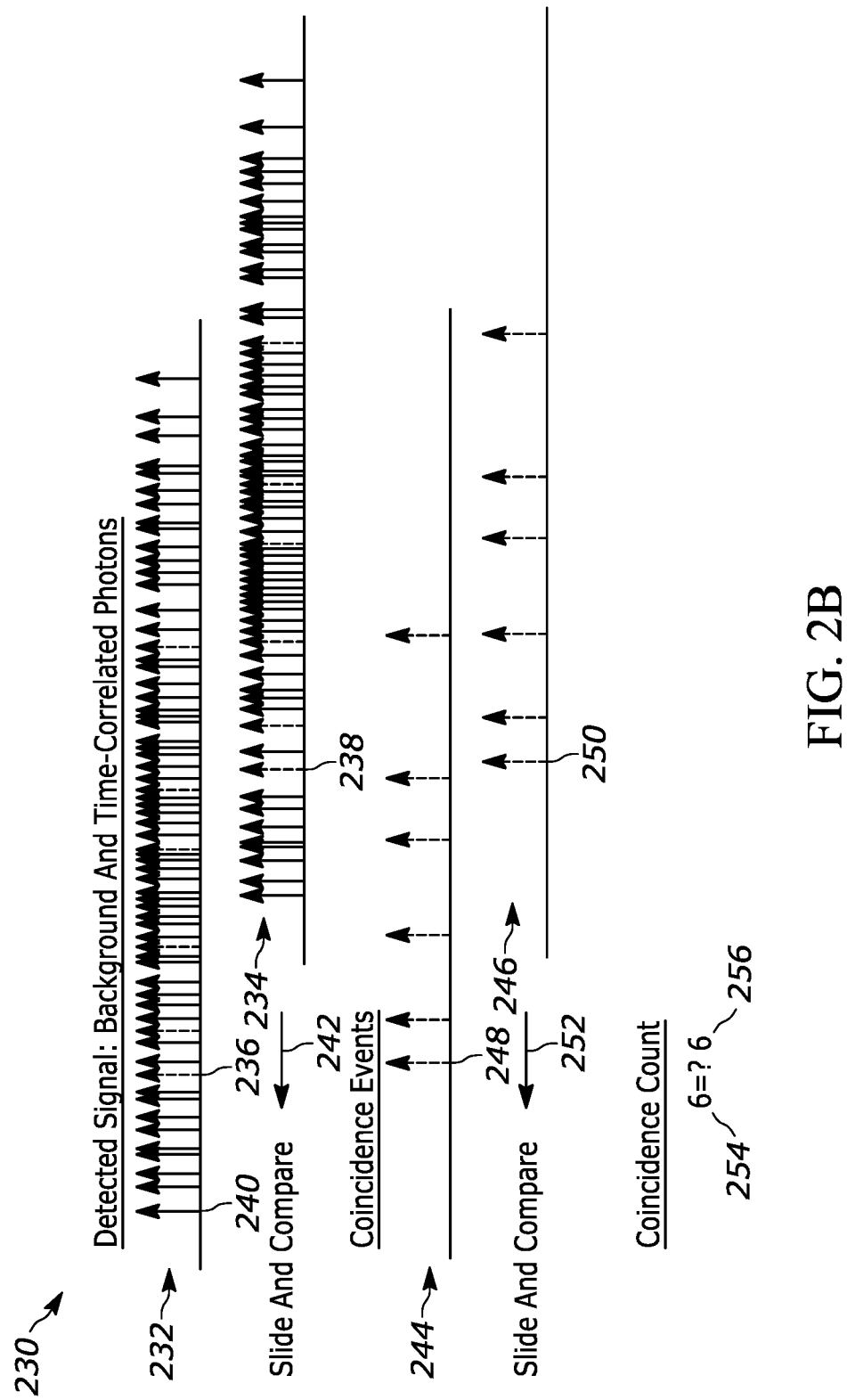

| | a | c | d | b |
|---|---|---|---|---|
| Allowed | Random | Random | Random | Random |
| Not Allowed | Coincidence | Coincidence | Random | Random |
| Not Allowed | Coincidence | Random | Coincidence | Random |
| Allowed | Coincidence | Coincidence | Random | Coincidence |
| Allowed | Random | Coincidence | Coincidence | Random |
| Not Allowed | Random | Coincidence | Random | Coincidence |
| Not Allowed | Random | Random | Coincidence | Coincidence |
| Coincidence | Coincidence | Coincidence | Coincidence | Random |
| Not Allowed | Coincidence | Coincidence | Random | Coincidence |
| Allowed | Coincidence | Coincidence | Coincidence | Coincidence |

| | D1A | D2A | D1B | D2B |
|---|---|---|---|---|
| Good | Event | Event | Event | Event |
| Error | Missed | Event | Event | Event |
| Error | Event | Missed | Event | Event |
| Error | Missed | Missed | Event | Event |
| Error | Event | Event | Missed | Event |
| Detected Error | Missed | Event | Missed | Event |
| Detected Error | Event | Missed | Missed | Event |
| Detected Error | Missed | Missed | Missed | Event |
| Error | Event | Event | Event | Missed |
| Detected Error | Missed | Event | Event | Missed |
| Detected Error | Event | Missed | Event | Missed |
| Detected Error | Missed | Missed | Event | Missed |
| Error | Event | Event | Missed | Missed |
| Detected Error | Missed | Event | Missed | Missed |
| Detected Error | Event | Missed | Missed | Missed |
| Detected Error | Missed | Missed | Missed | Missed |

FIG. 3C

| Configuration | Impairments To Be Addressed | Classical Communication |
|---|---|---|
| Coincidence Pair Detectors At Two Locations (e.g. Fig. 5) | Lost Correlated Photon Risk Is Acceptably Low To Be Ignored. | None |
| Coincidence Pair Detectors At Two Locations (e.g. Fig. 5) | Lost Correlated Photon Risk Is Moderate. For Example One Photon Lost Per Block Of Photons Where Block Size Is Reasonable. | Coincidence Count |
| Coincidence Pair Detectors At Two Locations (e.g. Fig. 5) | Lost Correlated Photon Risk Is High Enough That Warrant Finding And Correcting Individual Lost Photon Events. | Coincidence Times Sent Both Ways Between Detector Locations |
| Coincidence Pair Detector At One Location And Single Photon Detectors At Other Locations (e.g. Fig. 6) | Non-correlated Singles And Background Counts Must Be Addressed At Single Photon Detectors. And Lost Correlated Photons Are Possible At The Single Photon Detector(s) | Coincidence Times Sent From The Coincidence-pair Detection Location To The Single Photon Detector Locations. If Lost Photon Risk Is Not Acceptable, Coincidence Count, Or Coincidence Matches, Are Sent Back To The Coincidence-pair Detection Location From The Single Photon Detectors. |
| Single Detectors At Multiple Locations. | Non-correlated Singles And Background Counts To Be Addressed At The Single Photon Detectors | All Photon Arrival Times Must Be Exchanged Between All Locations. This Includes Non-correlated Singles And Background Counts. |

| Latency | Security Impact | Classical Information Required |
|---|---|---|
| None | No Added Risk Due To Classical Communication. | None |
| Classical Communication Channel Time-of-flight Latency And A Simple Check Of Matching Coincidence Counts | Small Risk Because Communication Of Coincidence Count Provides A Minimum Of Information | A Coincidence Count Per Block Pf Photons Where The Block Size Is Related To Loss Rate |
| Classical Communication Channel Time-of-flight Latency And Correlation Processing Latency. | Slightly Higher Risk Because The Combs Of Coincidence Times Provide More Information | A Timestamp Per Coincidence, No Time Stamps Required For Singles |
| Classical Communication Channel Time-of-flight Latency, Correlation Processing Latency And A Return Signal If Lost Photons Need To Be Addressed. | Slightly Higher Risk Because The Combs Of Coincidence Times Do Provide More Information | A Timestamp Per Coincidence. No TimeStamps Required For Singles Unless Loss Photons Are An Issue Too. |
| Classical Communication Channel Time-of-flight Latency, Correlation Processing Latency And A Return Signal If Lost Photons Need To Be Addressed. | Higher Risk Because More Singles Combs Are Exchanged. | A Timestamp Per Photon Arrival This Includes Both Non-Correlated And Correlated Photons. |

FIG. 7 (Continued)

METHOD AND SYSTEM FOR IDENTIFYING ENTANGLED PHOTONS WITHOUT CLASSICAL INFORMATION SHARING

CROSS-REFERENCE TO RELATED APPLICATION

The present application is non-provisional of U.S. Provisional Patent Application No. 63/327,892 entitled "Correlated Quantum State Identification System and Method", filed on Apr. 6, 2022. The entire contents of U.S. Provisional Patent Application No. 63/327,892 are herein incorporated by reference.

The section headings used herein are for organizational purposes only and should not be construed as limiting the subject matter described in the present application in any way.

INTRODUCTION

Systems that exchange information using single photons are useful for a wide variety of computing, communication, and measurement applications. Sharing of classical state information, quantum state information, and various hybrids of these can be used for many applications, such as to enable various secrecy, random number generation and sharing, computation, and transduction applications. As such, methods and systems that support and improve state transfer using single photons for various applications are and will be increasingly useful in advancing the state-of-the art. Of particular interest currently are systems that exploit time correlation across entangled sets of photons for which there are more than two photons in the set.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale; emphasis instead generally being placed upon illustrating principles of the teaching. The drawings are not intended to limit the scope of the Applicant's teaching in any way.

FIG. 2B illustrates embodiments of measured event lists that can be used for some embodiments of a system and method of sharing quantum information using time-correlated single photons of the present teaching.

FIG. 3B illustrates a table of cases for an event list associated with an embodiment of the system for sharing quantum information using time-correlated single photons of FIG. 3A.

FIG. 3C illustrates a table of lost photons and false coincidences for an embodiment of the system for sharing quantum information using time-correlated single photons of FIG. 3A.

FIG. 7 illustrates a table that compares different configurations of systems for determining correlated data using time-correlated photons of the present teaching.

DESCRIPTION OF VARIOUS EMBODIMENTS

Figure 1:
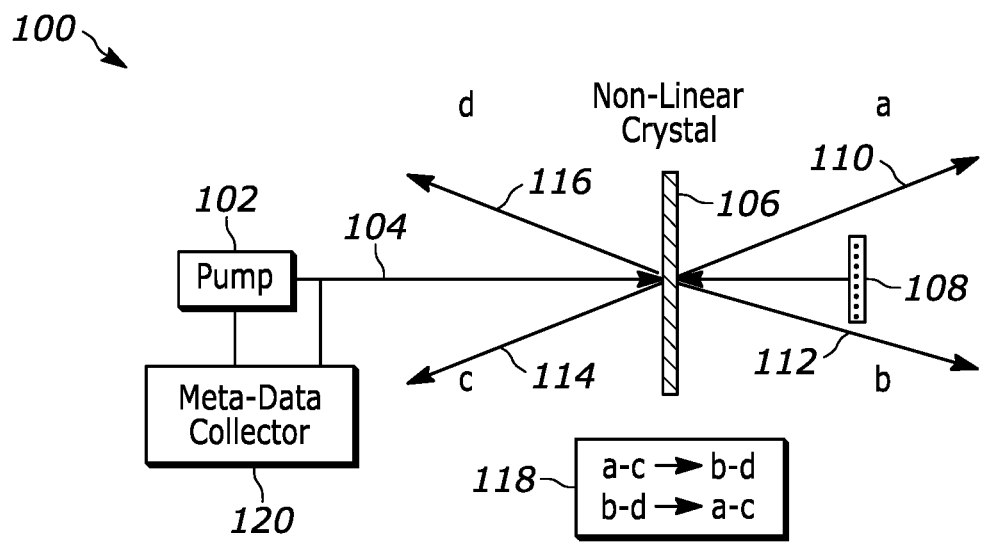
FIG. 1 illustrates an embodiment of a source that generates time-correlated quadruplets of single photons.

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings can be performed in any order and/or simultaneously as long as the teaching remains operable. Furthermore, it should be understood that the apparatus and methods of the present teachings can include any number or all of the described embodiments as long as the teaching remains operable.

Quantum entanglement is a powerful resource that has numerous applications in a variety of processing, sensing and communications applications. Similar to other resources, for example coal, electricity, and computer memory, systems and methods that allow users and applications to efficiently and effectively use the resource that are essential to enable existing and future applications to exploit the resource. One important and basic requirement for the efficient and effective use of quantum entanglement is the need to quickly and/or easily identify the entangled resources. For example, each photon in a pair of entangled photons can carry state information that is entangled such that the values of those states are the same when measured. As such, it is necessary to identify photons that are part of a pair of entangled photons, to know that a particular measured value is one of two shared correlated values. Generally, each photon in a set of entangled photons can carry state information that is entangled such that the values of those states are the same when measured. As such, it is necessary for many applications to identify photons that are part of a set of entangled photons in order to know that measurements from photons of the set are correlated.

Identifying resources that are entangled is notably different from classical resource identification system or methods. Some of the differences arise, at least in part, because the measurement of a quantum resource collapses the associated quantum state or states in an irreversible way. Some of the differences arise, at least in part, because quantum resources can be quantized where their states take on only specific and/or singular values. Some of the differences also arise because entangled resources can carry perfectly correlated state information. Some of the differences also arise because quantum entangled resources are subject to noise and loss. Also, some of the differences arise because of various combinations of these qualities. Furthermore, some of the difference arise because many well-known, low cost, sources of entangled photons generate orders of magnitude more photons that are not entangled compared with photons that are entangled and for many practical systems the photons that are not entangled must not be erroneously identified as entangled.

The entangled photon resources described in the present teaching can be sources of, physical forms of, and/or resources that provide quantum information to a variety of different applications and systems that use quantum information. Applications and systems that use quantum information use different kinds of quantum information in different ways. It is useful to be clear about the differences between these different kinds of quantum information, because this impacts which kinds of quantum information are used for which purpose so that the applications and systems can make the most efficient use of the quantum information.

For purposes of the present teaching, we describe two different forms of quantum information: quantum information in a quantum form and quantum information in a classical form. Quantum information in a quantum form includes quantum information in a potential state. Some refer to a potential quantum state as "res potentia", that is, offering possibilities. Examples of a potential state include a coherent state, a superposition state, and an entangled state. In some cases, a potential quantum state is a state that is unknown and/or not yet measured.

Quantum information in a quantum form can sometimes be referred to as information being in a potential state, res potentia, maintaining uncertainty, being coherent, being in superposition, being entangled, being unknown, and various other terms. A quality of this quantum information in a quantum form is that it is not known until it is measured by what is commonly referred to as classical means or classical systems.

Quantum information in a quantum form is generated, transmitted, processed, moved and/or stored in a manner that preserves the potential, or res potentia. For example, this information uses a generator, communication channel, processor and/or storage system that does not destroy or decohere the potential state (or at least part of the potential state) to a point where the quantum information is lost. Although some quantum states can survive in some classical channels or through some select operations, in general, these actions for information in a quantum form are very different from similar actions for information in a classical form. This is, at least in part, because systems that process information in a classical form can decohere, collapse or otherwise destroy the quantum information in a quantum form and that fundamentally changes the character of the quantum information. It should be understood that the interaction of quantum information in a quantum form with any classical moving, processing or storage information system converts the "possible" into "actual."

We also use the term quantum information to include information in a classical form. This quantum information includes, for example information in a measured or collapsed state. This kind of quantum information is, for example, the outcome of a measurement of potential state the yields a particular state value (e.g. one of the possible superposition states). We also use the term quantum information in a classical form to include wavefunction information about a quantum potential state. Wavefunction information can include a deterministic description that bounds and/or provides the evolution of a potential state of a quantum system. Wavefunction information can indicate the possible measured states of a quantum system. Wavefunction information can provide deterministic information about, for example, where and/or when a quantum state is or will be. These are just examples. Although both the measured states and the wavefunction are quantum information, they differ from the potential state information in that they are classical in nature. For one thing, they are actual or known. Also, they can be communicated over classical channels and used and/or processed by classical information systems, including classical memory, CPU, analog and/or digital processors, and a variety of classical sensing and measurement systems that may be analog and/or digital in nature, without any fundamental change to their properties.

Thus, quantum information can include quantum information in a classical form and quantum information in a quantum form. Quantum information in a classical form can include wavefunction information and collapsed state information. Quantum information in a quantum form can include potential states, that can be, for example, states that are entangled, in a superposition and/or coherent.

It is important to emphasize that quantum information in a quantum form has certain quantum properties, e.g. quantization, superposition, non-locality, correlation and combinations of these qualities. A quantum potential state description applies when the system is coherent or still in superposition. A notable quality of the potential state is that at least some of the quantum state information is not known. Once the carriers of quantum state information in a quantum form, e.g. photons, atoms, ions, and superconducting junction currents, are measured to yield the quantum state information, the states of those carriers are collapsed, and therefore yield measured quantum state information in a classical form. This measured quantum state information is classical in nature, and can be further processed in a classical way, but yet it is intimately connected to the quantum nature of the potential state that was measured, and this is why it is referred to as quantum information. As examples, non-locality, and correlation properties are characteristic of quantum information. These properties are not possible with purely classical information derived from classical systems.

The above description of quantum information is important to providing a method and system that allows efficient access and use quantum information by applications and systems. The above description can apply regardless of whether these applications and systems that use quantum information are quantum in nature, classical in nature, or hybrids of quantum and classical in nature. The ability to parse quantum information into those that are in a quantum form and those that are in a classical form supports the design and implementation of numerous different applications and systems that use quantum information practically, effectively, quickly, efficiently, accurately, precisely, securely, remotely and robustly, etc. just to name just a few advantages. This is especially true as compared laboratory research systems that do not rely on careful attention to the distinction and different uses of the different kinds of quantum information that are pertinent to the system.

In addition to the above description of the different forms of quantum information, quantum and classical, it is important to consider how the systems and applications use the quantum information. Some applications and systems that use quantum information use a portion of the quantum information they intake to directly process, store, measure, sense and/or communicate. We refer to this portion of the quantum information as the quantum data. Another portion of the quantum information the applications and systems intake is used to aide in the processing, measuring, sensing and/or communicating of the quantum data. We refer to this portion of the quantum information as the quantum metadata.

The quantum data and quantum metadata terminology is somewhat analogous to the use of the term metadata in information technology as referring to information about the data, as opposed to the data itself. The portion of quantum information that is considered quantum data and the other portion of quantum information that is considered quantum metadata is more closely tied to the application or system that is using the quantum physical system. In contrast, whether quantum information is in a classical form or a quantum form is more closely tied to the particular quantum physical system. It should be understood that the definitions or categorizations of what information is quantum metadata and what information is quantum data can change from one application to another, or for different operations within the same application. For example, one application using, e.g. a photonic quantum physical system, may use a particular measured value, e.g. a polarization value, as quantum data, and a different application using the same physical system may use that same measured value as quantum metadata.

Some applications, like one that uses a measured polarization value, are using quantum data that is in a classical form. Some applications and systems that rely on quantum information use quantum data that is still in a potential state, in other words quantum information in a quantum state. As an example, these application and systems take in and process carriers of quantum states that are coherent, e.g. maintaining superposition and/or having details of the particular state values that are still unknown at intake and remain so potentially also through subsequent processing steps. Still other applications and systems that rely on quantum information use hybrids of these forms of quantum information as quantum data.

References herein to classical information include information that can be used by classical information systems. As such, this includes general classical information that is naturally or by its origin in a classical form and can also include quantum information in a classical form.

One useful feature of the method and system of the present teaching is that the quantum entangled resources can be identified in different locations with minimal, or even no, classical information exchange between those locations. This classical information exchange can include exchange of quantum information in a classical form and/or other classical information being exchanged between the different locations.

Another useful feature of the method and system of the present teaching is that the entangled resources can be identified with low latency. This low-latency identification is possible, at least in part, because of the non-local nature of entangled quantum states. The latency of identification depends upon the way in which the various kinds of classical information is collected, shared and/or processed. One useful case is when the identification of entangled resources in different locations is made without requiring any classical information sharing latency associated with the time-of-flight of classical information between the two locations of the entangled resources. There are also methods according to the present teaching where only one-way classical information transfer latency is needed. In addition, by reducing the amount of classical information that needs to be transferred, communication latency can be further reduced and also processing burdens are lower. To summarize, the quantum state identification method and system of the present teaching can benefit from one or more of reducing the amount of classical information transferred, reducing the time-of-flight latency of classical information transferred, and reducing the processing latency of the classical information transferred.

Another useful feature of the method and system of the present teaching is that the entangled resources can be identified with high precision in multiple quantum bases, such as, in space, time, frequency, and/or phase. Another useful feature of the method and system of the present teaching is that the entangled resources can be identified within high background and/or noisy environments and from sources that generate large quantities of photons that are not entangled or other environmental noise. Another useful feature of the method and system of the present teaching is that entangled resources can be identified with low computational complexity, or even with absolutely no computation. Yet another useful feature of the method and system of the present teaching is that the entangled resources can be identified privately and/or secretly and/or securely. Said another way, the entangled resources can be identified without a third party knowing of the identification. That is, the entangled resources can be identified even when third party snooping is noted in the identification process. Furthermore, third parties are not able to meddle in the identification processes. The security features arise in some cases because quantum information in a quantum state cannot be duplicated or measured without disrupting the system in a manner that is visible to legitimate players, and also because little to no classical information needs to be exchanged because of how particular kinds of quantum data are tied to their quantum metadata. These advantages described above combine to provide identification of entangled resources that is very robust and highly tolerant to numerous types of conditions allowing many practical applications using these entangled resources.

Those skilled in the art appreciate that there is a need to identify entangled resources when those resources are confined to localized, closely-spaced systems in applications, for example, microcircuit devices (chips), hybrid devices, board-level devices, and/or boxes for systems and subsystems. The need to identify entangled resources can apply when the entangled resources are provided to widely distributed systems that can span even beyond a global scale. Thus, different locations referred to herein can be positioned in closely-spaced through widely spaced locations.

The method and system of the present teaching addresses a need for efficiently identifying entangled resources and to share secrets and other entangled state information based on this identification of entangled resources. Numerous applications, including some example applications described herein, but many others as well, can benefit from, and build upon, the method and system disclosed herein.

Much of the description herein details entangled systems that use photons. However, it should be understood that the teaching is not intended to be so limited. As understood by those skilled in the art, aspects of the teaching can apply to resources of numerous entangled systems including, for example, entangled atomic systems, ionic systems, spin systems, superconducting systems, quantum dots, and other many other types of systems. The teaching can also be applied to hybrids of these and other systems.

Single photons are a powerful resource for sharing quantum state information that can be used in a variety of quantum and/or classical systems. Single photons are indivisible particles and consequently their measurement is unique and well-defined. This leads to desirable features including privacy, security, tolerance to third party meddling and/or snooping, and quantization features useful for various communication, computing, and sensing applications.

At the same time, various optical sources are available and currently in development that can generate two, or more, entangled photons at a same time. For example, spontaneous parametric down conversion (SPDC) generates pairs of single photons simultaneously in time. Some configurations of SPDC source, for example, those that use forward and backward pumping, can generate four photons at the same time. Processes, such as four-wave mixing and Raman can also be used to generate pairs, triplets and/or quadruplets of photons that are all generated at the same time. In many cases, the time correlation is owed to time-energy entanglement processes. We may refer to these entangled sets of single photons as time-correlated photon sets or sets of entangled photons.

It should be understood that there can be any number of time correlated photons in a set. A set of four entangled photons may be referred to as a quadruplet. Multiple sets of entangle photons are typically generated by an optical source over time. The number of sets per second is referred to as the generation rate. Spontaneous parametric down conversion sources, and many other down conversion and nonlinear sources can be configured to generate multiple sets of entangled photons over time. Some random or spontaneous processes generate streams of these time-correlated photon sets such that the time between arrivals of the time-correlated photons is governed by random processes and so the arrival times of these photon sets, and the inter-arrival time between photon sets, are correlated random values.

A common challenge with using the properties of the entangled time-correlated photon sets is that the time-correlated photons are typically surrounded in, e.g., time and space, by high levels of background photons, which is essentially noise to practical systems. Low cost sources, such as SPDC sources, typically generate more (often orders of magnitude more) photons that are not time-correlated than are time correlated. Furthermore, photons are measured using detectors that produce substantial levels of background signals in addition to actual photon measurements. One feature of the present teaching is the ability to identify time-correlated photons amidst high levels of noise, photons from sources that are not correlated, and background signals with a minimum amount of computation and hardware.

Thus, one feature of the present teaching is that time correlations of entangled single photons having non-local properties can be exploited in distributed systems to achieve new functionality and/or improved performed metrics. Another feature of the present teaching is recognition that delivering different numbers (subsets) of time correlated photons from a set, or a plurality of sets, to different locations can be used to improve performance of systems sharing quantum and/or classical information. In particular, using time correlations of entangled single photons according to the present teaching can achieve performance improvements in synchronization, reduction of noise and/or background resilience, and/or measurements of time and space that rely on quantum state information exchange. These performance improvements can be robust to high background counts.

Prior art entanglement identification schemes require the exchange of measured quantum states together with high levels of non-quantum state noise between the parties that are sharing entanglement. Some embodiments of the entangled photon identification method and system of the present teaching can be made without sending the particular measured quantum state values at all. Rather, a small amount of quantum metadata, or information about the quantum states, but not the state values themselves that are the quantum data can be shared, and entangled photons can be identified using a very limited amount of metadata. Another important feature of the present teaching is that the "perfection" provided by time correlations allows use of relatively simple matching algorithms of quantum metadata associated with locally measured events to identify time-correlated measurements.

This matching based on quantum metadata associated with identifying the presence of correlated states means that systems can share the locally determined quantum state information in a particular basis without the need to transfer information that relates to that basis. This matching based on correlated data means that systems can share time data without sharing time information of any kind. Also, this matching based on presence of correlated states also means that information can be shared without channels that have characteristics to support delivery of that state information. For example, asynchronous channels, such as a packet network or link, can support precision node synchronization. Nominally synchronous connection-oriented channels with path length jitter can support precision position information. The matching based on presence of correlated states further means simple algorithms can identify correlations which can greatly improve system performance. For example, a simple cross correlation of two lists of measured events can identify correlations, and these methods minimize the number of cross correlation computations required.

Various sources support generation of single photons, including time-correlated single photons, that are entangled in various distinguishable bases. Entanglement refers to photons that share quantum state information such that measurements of each photon in one or more bases, even if performed at different times and/or places, yields measured quantum states in each basis that are perfectly correlated. Sometimes these states in each basis are referred to a superposition states. Example bases include time-energy, spatial position, momentum, polarization, wavelength and phase. Entangled photons have been shown to be powerful for many applications including, for example, quantum key distribution, sensing and measurement, quantum computing, and various classical and/or quantum communication systems. Entangled photons are also integral to numerous scientific applications, including teaching laboratory exercises, astronomical observation, molecular science and chemistry, and numerous physics applications. The ability to efficiently and reliably find entangled photons such that the entangled state information can be used in these applications is one feature of the time-correlated photon identification method and system of the present teaching.

Time-energy entangled photons possess a continuum of entangled time probabilities defined by their probability wavefunction, which we may refer to as a time wave packet. The probabilistic nature of the time-correlated value can be exploited if sub-wavepacket time resolution is used. Even with lower time resolution, the correlation can be exploited to find correlated photons precisely and/or within large background environments. In addition, many entangled photon generators rely on stochastic processes that are themselves random, allowing time-correlated photons to carry random time information based on those processes. These features are exploited in various ways for information sharing schemes that use embodiments of the time-correlated photon identification system and method of the present teaching.

Position-momentum entangled photons possess a continuum of entangled position probabilities defined by their probability wavefunction, which we call a position wave packet. The probabilistic nature of the position-correlated value can be exploited if sub-wavepacket spatial resolution is used. Even with lower spatial resolution, the correlation can be exploited to find correlated photons in space precisely and/or within large background environments. In addition, many entangled photon generators rely on stochastic processes that are themselves random, allowing position-correlated photons to carry random yet correlated position information based on those processes. These features are exploited in various ways for information sharing schemes that use embodiments of the time-correlated photon identification system and method of the present teaching.

Time-correlated photon pairs, triplets and/or quadruplets can carry additional entangled state information in one or more bases. In these cases, identified time-correlated photons can be used to determine entangled quantum state information that may reside in other bases. That is, identified time-correlated photons can be used to determine the correlated state information carried by the identified time-correlated photons and measured by analyzers and/or detectors in one or more nodes. This enables the sharing of quantum state information carried by the time-correlated photons. In various embodiments, the information sharing can have various attributes including, for example, secrecy, privacy, non-locality, background immunity, randomness, and/or precision owing to ideal or near-ideal correlation of the state information.

The state dimension of an entanglement basis can be considered as the number of possible measurement outcomes of that basis. The number of possible outcomes is sometimes referred to as a dimension of the superposition state. For example, some systems use a polarization basis having two states, H and V. Interferometric detection schemes, for example, can exploit the continuous bases of position or time. It should be understood that various embodiments of entangled quantum state sources that can be used in the present teaching can provide entangled quantum states in various numbers of bases with various numbers of state dimensions for each basis.

Additionally, random arrivals in time or space of entangled photons in time and space bases can provide large-dimension measurements in addition to, for example, a potentially low-resolution arrival time measurement. This is generally true for bases that are nominally continuous bases of e.g., spatial position and time, but also certain other optical phase bases. For example, systems that use a spatial position basis on arrivals of stochastic photons correlated in position can be limited by a spatial resolution of the detection system and may have dimensions of, for example, two, four, ten or even thousands or millions. As one specific example, consider spatial position of pairs of photons emerging around a cone of phase matching in a nonlinear crystal. Detector resolution as well as optical mode size as determined by the details of the optical configuration can divide the spatial position into various measurable sizes based on detector position and size as well as optical mode size and crystal dimension and position.

In various embodiments of the present teaching, although time is most frequently described as an identification basis, additionally or alternatively, one or more basis of entanglement can be used to establish coincidence, or to find entangled photons. Other bases used singularly, or in combination, can be used to improve the fidelity (e.g., probability of error, speed or latency, etc.) of establishing the coincidence and/or to share values associated with the measurement of the other basis or bases.

In various embodiments of systems and methods of the present teaching, the use of bases, or combinations of bases, with larger state dimensions generally helps to establish coincidence with lower error, lower latency, and/or to impart more information by measuring fewer photons.

Another feature of the systems and methods of the present teaching is the ability to identify time-correlated photons without relying on complex, high-resolution time synchronization schemes within and/or across physically dispersed nodes that are sharing information. The time-correlated photon identification system and method of the present teaching is meant to be general so it can be applied to a variety of applications, including quantum applications, classical applications, and hybrids of these two modalities and are not limited to specific examples and embodiments of applications described herein.

Numerous entanglement experiments use time coincidence counters to verify entanglement and validate the Bell inequality. These experiments rely on time coincidence for entanglement generated by spontaneous parametric down conversion as a valid determinant of entanglement and identification of photons that can carry other entangled state information. However, coincidence counters can be difficult to use in practice. For example, even the length of the wire between the detector and the counter can skew timing. The future success of transition of quantum systems to practice demands systems and methods that can allow the use of quantum "coincidence" detection schemes that practically work in real life systems. Systems and methods are needed that can practically scale and provide coincidence determination in real systems that are separated spatially, including over vast geographical distances. Systems and methods are needed that use existing classical networks to do the "classical part" of realizing these systems without building an overlay network with precise latency guarantees. The system and method of time-correlated photon identification of the present teaching can address many of these challenges.

One feature of the present teaching is that it can use high-brightness single-photon sources to generate time-correlated photons. Some high-brightness sources create large numbers of quantum-entangled, time-correlated photons using Spontaneous Parametric Down Conversion (SPDC). SPDC relies on laser-pumped nonlinear crystals in various configurations. The pumped crystals emit photons that are time correlated. The crystals can also be configured to emit entangled photons in one or more basis which may include polarization, frequency (color) and/or spatial position. The state of a photon emitted in this multi-dimensional quantum state can be measured and represented as having an arrival time, a position, a frequency and/or a polarization.

One example case is a source that generates sets of four time-correlated photons. In addition to the quadruplets, these sources can also emit pairs and singles that are not part of a quadruplet. FIG. 1 illustrates an embodiment of a source 100 that generates time-correlated quadruplets of single photons. A pump laser 102 generates pump light 104 incident on a nonlinear crystal 106. In some embodiments, the source 102 and crystal 106 are configured in a type-II down conversion arrangement. A mirror 108 reflects some of the pump light 104 back toward the crystal 106. In some embodiments, the pump laser 102 is a blue and/or UV laser and the crystal 106 is a Beta-Barium Borate (BBO) or Bismuth Borate (BiBO) crystal. More details of an example of such a source can be found in the reference, Nikolai Kiesel, Christian Schmid, Ulrich Weber, Géza Tóth, Otfried Gühne, Rupert Ursin, and Harald Weinfurter, "Experimental Analysis of a Four-Qubit Photon Cluster State," Phys. Rev. Lett. 95, 210502, 2005.

It should be understood that the source 100 of FIG. 1 is just one particular example of a source that can be used with systems according to the present teaching. Many types of single photon sources can be utilized, for example, sources that use Type-I and Type-0 phase matching, sources that use periodically polled crystals, including lithium niobate and doped lithium niobate poled crystals, and/or sources that rely on nonlinear processes in optical fibers. A variety of crystals and nonlinear materials can be pumped using infrared laser sources, which can be configured, for example, to emit photons in the infrared at wavelengths that are compatible with optical fiber transmission with low loss.

The source 100 can generate four photons simultaneously that emerge in particular directions, labeled a 110, b 112, c 114 and d 116 in FIG. 1, resulting in a quadruplet of time-correlated photons. The emergence angle, or emission direction, is set by a phase matching condition in the crystal 106. It is also possible that pairs of photons can emerge simultaneously along directions a 110 and b 112, which is referred to as forward directions, or direction c 114 and d 116, which is referred to as backward directions, without being part of a quadruplet. However, it is very unlikely that photons will emerge along one forward direction, a 110 or b 112 and one backward direction, c 114 or d 116, simultaneously without being part of a quadruplet. Therefore, the coincidence of any forward direction photon with a backward direction photon can herald a quadruplet with very high probability. This means that by appropriately configuring coincidence determination between different pairs of this particular kind of quadruplet allows identification of quadruplets with high fidelity. The table 118 shows some examples that a coincidence pair from directions a-c indicates a presence of photons from directions b-d in a time-correlated quadruplet, as does a coincidence of b-d photons imply a correlated coincidence of a-c photons. We note that a coherence length of the pump 102 must be sufficiently long that the forward propagating field and the backward propagating field from mirror 108 are coherent at the crystal 106. We also note that generally quadruplets of the present teaching can effectively arise from either so-called double pair emission and from coherent generation of forward and backward pairs in the crystal 106.

In some embodiments, a metadata collector 120 is used to generate metadata about the quantum states. For example, the metadata collector 120 can be connected directly to the pump source 102 and/or to the optical output of the pump 102. The metadata collector can determine a pulse shape and repetition rate that can be used to determine time-windows where the entangled photons may be found. The metadata collector 120 can determine other information that relates to the quantum states generated by the interaction of the pump in the crystal 106, including for example, polarization, power, pulse width, amplitude and phase noise, and other information about the pump that contribute to the quantum states that are generated.

In some embodiments, the metadata collector 120 is collecting wavefunction information about the quantum states being generated in the crystal. For example, the metadata collector 120 determines specifics of the optical signals and the associated modes that pump the crystal 106 that yields information about when, where and in what spatial condition, the entangled photons emerge from the crystal. As a simple, but important example, during time periods when there is no pump signal applied to the nonlinear crystal, no entangled photons will emerge. Other examples of wavefunction metadata that can be collected include, for example, polarization, frequency and phase properties of the photons as well as deterministic time windows of their emergence.

We may refer to pairs of a quadruplet that provide a higher probability of indicating a quadruplet as preferred pairs. We note that the description herein of high-fidelity indication of quadruplets by measurement of preferred pairs is provided for coincidences of photons that emerge from a crystal in different directions, forward and backward. Specifically, a forward emerging photon and a backward emerging photon are a preferred pair. However, systems and methods of the present teaching are not so limited. Generally, systems of the present teaching can utilize coincidence measurements of pairs of a quadruplet that herald that quadruplet with a high probability (preferred pairs) as compared to measurements of different pairs of that same quadruplet. This would be true, for example, for systems that had certain phase matching conditions that were specific to the quadruplet generation and not shared with phase matching conditions of pair generation. Additionally, some embodiments do not have preferred pairs generated, and/or do not use preferred pairs, and, thus, coincidence of any pair in the quadruplet can be used to identify the quadruplet. This can be done, for example, using sources that produce low background rates of singles and/or pairs together with producing quadruplets at a high rate.

One feature of the present teaching is that identification of pairs from a quadruplet can be used to identify all members of the quadruplet. This allows sharing of quantum information associated with measurements of photons in that quadruplet. The sharing can include exchanging of information from measurements of the entangled resources that is arranged in ordered lists. These lists can be the same or similar to lists that are used to identify entanglement and share quantum information using entangled pairs of photons. Some example identification methods and systems, and also associated applications that utilize identification, have been disclosed in U.S. patent application Ser. No. 17/465,235, entitled "Method for Synchronizing and Locking Clocks", which is incorporated herein by reference and assigned to the present assignee. While configurations for identifying quadruplets based on pairs is described herein, the present teaching is not so limited to this description. Using the methods and apparatus of the present teaching, subsets of various numbers of photons of sets of various numbers of time-correlated photons can be used to identify the sets of time-correlated photons in various embodiments of the system and method for identifying time-correlated photons of the present teaching.

Figure 2A:
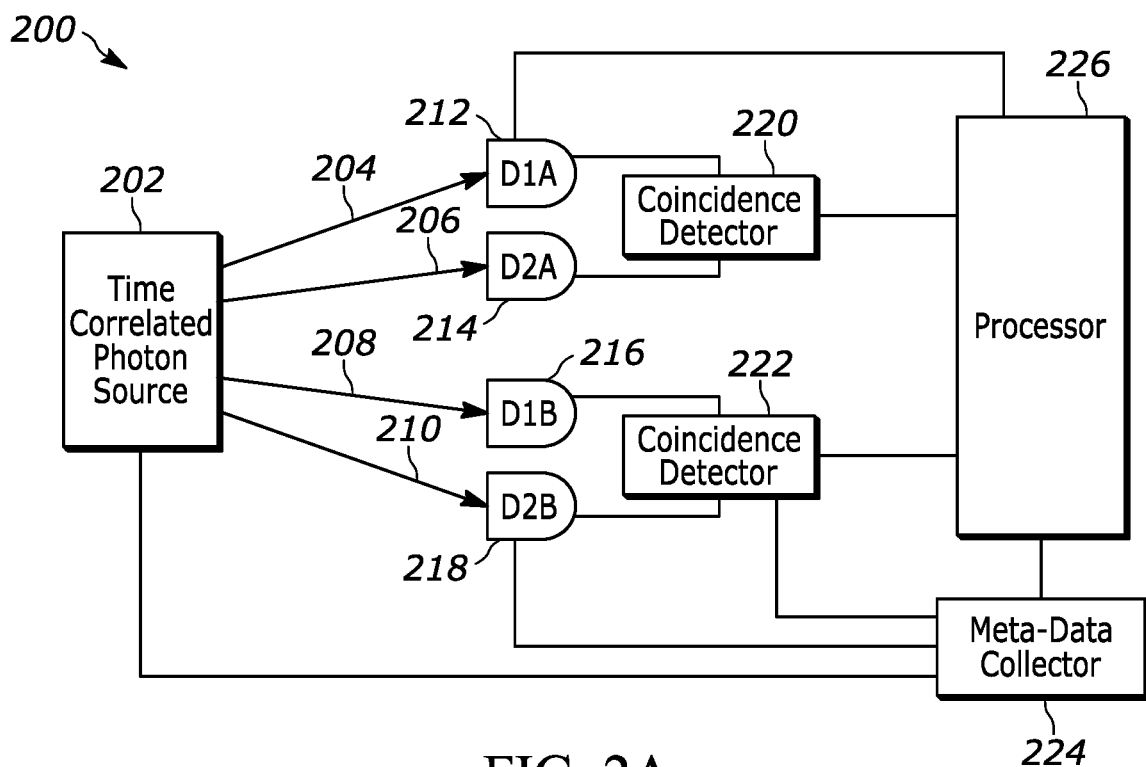
FIG. 2A illustrates an embodiment of a system for generating and measuring time-correlated quadruplets of the present teaching.

FIG. 2A illustrates an embodiment of a system for generating and measuring time-correlated quadruplets of the present teaching. A time-correlated photon source 202 generates four time-correlated photons that emerge at four outputs and follow four paths, 204, 206, 208, 210 to four detectors 212, 214, 216, 218. The paths 204, 206, 208, 210 can be free space paths or any type of guided paths, such as optical fiber paths and other optical waveguide paths. Two detectors 212, 214 are connected to a coincidence detector 220, and two other detectors 216, 218 are connected to another coincidence detector 222.

In the system 200, the source 202 produces four photons simultaneously. In some embodiments, two of the photons are directed to one location that includes the two detectors D1A 212 and D2A 214, and two photons are directed to a second location that includes two detectors D1B 216 and D2B 218. There is at least one local coincidence detector 220 at the location that includes D1A 212 and D2A 214, and a second local coincidence detector 222 at the location that includes two detectors D1B 216 and D2B 218. In some embodiments, the local coincidence detector can be as simple as a AND logic gate.

When the coincidence detector 220 finds a local coincidence at the location that includes D1A 212 and D2A 214 (in other words, determines there are simultaneous detection events at D1A 212 and D2A 214), a time-correlated photon pair has arrived. We note that the description assumes equal time-of-flight (TOF) from source 202 to detectors 212, 214, 216, 218 of each photon. The time correlation of sets of entangled photons ensures that when the location that includes D1A 212 and D2A 214 detects a local coincidence, the location that includes two detectors D1B 216 and D2B 218 will also detect a local coincidence. As mentioned before, much of the description herein assumes that latency from source to detector(s) is managed such that "coincidence" is synonymous with simultaneity.

As understood by those skilled in the art, various known approaches to addressing differences in latency from source to measurement can be used in keeping with the systems and methods for identifying time-correlated photons in distributed systems of the present teaching. For example, if the time-of-flight is longer on link 204 than 206, or link 208 than 210, the coincidence detector can be preceded by a fixed time delay in the connection between D1A or D1B to the coincidence detector. So more generally the concept of coincidence embodied herein allows for the use of known methods and systems at the receivers and receiver nodes that correct for any TOF, detection time, or any other differential latency in the system that is delivering and measuring the photons that carry the quantum correlated states. In fact, in some embodiments, systems and methods of identifying time-correlated photons can be used to determine and correct some latency differences from source to detector(s). That is, identifying time-correlated photons includes compensating for time delays the determination of the coincidence. This can include, for example time-of-flight delays, detection latency, circuit latency, optical measurement latency, etc.

Because the location that includes D1A 212 and D2A 214 detecting a local coincidence means the location that includes two detectors D1B 216 and D2B 218 will also detect a local coincidence, the two locations can each construct ordered lists of measurements of time-correlated events that match without exchanging any classical data. No common quantum state basis is needed to identify coincidences. In some embodiments, times between arrivals of time-correlated photons is used to produce a shared random number, and there is no need to share any information between locations to accumulate the shared number. In some embodiments, measurements of additional entangled basis information carried by the time-correlated photons is shared information and there is no need to exchange any information between nodes to accumulate this shared entangled state information. For example, polarization and/or position information can be shared in this way. In some embodiments, multiple basis can be combined to accumulate this shared entangled state information.

In some embodiments, one or both of the coincidence detectors 220, 222 are connected to a processor 226, that can be one processor or multiple processors that can be distributed. This supports the processor 226 generating event lists that include coincident determinations from one or both of the coincidence detectors 220, 222. Those lists may be formulated as time stamps, marks in time bins, or other formats. In some embodiments one or more of the detectors 212, 214, 216, 218 are connected to the processor 226 (only one connection shown). This supports the processor 226 generating event lists that include single photon detection measurements, that would typically also include background counts events, of the one or more of the connected detectors 212, 214, 216, 218. Those lists may be formulated as time stamps, marks in time bins, or other formats. In some embodiments, one or more of the photon source 202, one or more detectors 212, 214, 216, 218 (only one connection shown), one or two coincidence detectors 220, 222 (only one connection shown) can be connected to a metadata collector 224 that is connected to processor 226. This supports the processor 226 generating metadata information lists. The lists can include, for example, one or more of number of coincidences in a time window, time-windows of expected entangled pairs based on pump pulse information, background counts or expected background levels based on detector bias point, measurement start and stop times in some coordinated time frame, quantum state coherence levels (including deterministic and probabilistic values or estimates), various wavefunction information, and many other kinds of information.

A distinction is made between metadata, which is information about the quantum states, and quantum state measurement information or values (quantum data), in that a quantum measurement collapses the quantum state, whereas metadata can be collected without collapsing the state. As one example, this feature allows the quantum privacy of a superposition basis of an entangled system to be kept locally, while the other information is shared publicly to support privacy and security applications. As another example, this feature allows multiple different kinds of entanglement sharing applications to identify entanglement while sharing small amounts of data about the entanglement. In some cases, the measured quantum state information can carry a high capacity of information, if it is part of a high-dimensional quantum basis, and the information exchanged to "tap" this capacity can be small. As one particular example, a number of coincidences, which can be a single number, can be used to verify many precisely measured time-entangled photon (or even just one). For example, the resulting shared timestamp values that represent the measured quantum state value of these entangled photons can represent a lot of information, as depends on the application.

It is important to note the generality of the sharing of the metadata and the sharing of the quantum entangled states used to describe the present teaching. Different applications would construct and use different combinations of these measurements, lists and sharing methods in different ways. Some specific examples are presented herein. However, it will be clear to those skilled in the art that numerous systems and methods can benefit from and use the association of the metadata and the measured quantum state data to share and derive quantum entangled state information. For example, the method and system is applicable to distributed systems, localized systems and hybrids of localized and distributed. The method and system can be applied to numerous systems, such as privacy systems, key distribution systems, measurement systems, coding and communication systems, location systems, synchronization systems and many other kinds of systems that use entangled quantum state information. Embodiments of the system and method that use the associated metadata can, for example, help reduce information sharing requirements, enhance privacy and security, improve accuracy, reduce latency, and/or support high background count operations while sharing quantum state information as compared to systems that rely on sharing of quantum state information alone.

In some embodiments, lists of measurement event information generated in two separated locations that is associated with the coincident photons determined in each location is shared information between those locations with no classical information exchange. The lists can include, for example, arrival times of coincidence photons. The lists can be ordered by time of arrival. Time can be secretly shared because no other information is shared between the nodes.

Additionally, latency is reduced since there is no waiting for a classical exchange to find coincidences or to otherwise establish the time-correlation property and associated shared time information of a photon that belongs to a quadruplet. Most practical systems will benefit from "starting" the accumulation of both lists at roughly the same time (as determined by a common reference). However, since coincidences in real systems tend to occur at low rates (e.g., milliseconds), the accuracy of this "start" time can be low. Importantly, in some configurations, simple free running clocks can be used in each location. In some configurations, a common time reference and/or start time can be resolved simply by energizing, shuttering, or otherwise time-stamping the entangled source until ready to effectively "start" both lists at the time entangled photons start to arrive at both locations.

In some embodiments, the state dimension of the time basis is dependent on the clock resolution at each detector pair. The clocks can be running at nominally the same rate, to an accuracy that provides a desired resolution. If the time basis is a time between arrivals, delta-t, absolute time is only relevant to insure both detectors start their ordered list with the same event making absolute time irrelevant and clock accuracy requirements only relevant for short inter-arrival times.

One feature of the present teaching is that the amount of classical information shared between locations can vary as desired or required by a given application. In some embodiments, the classical information shared is the quantum metadata that is quantum data in a classical form associated with the quantum state information. Varying the amount of classical information shared can also be expressed as varying the level of classical isolation of the two locations. For example, the isolation can be complete, with no classical information shared, or the isolation can be partial with some information shared. As described above, by using coincidence of pairs of quadruplet time-correlated photons, time and other quantum state information can be shared between locations without any need to send any classical information about the measured states. In various embodiments, different amounts of information about the measured quantum states, and associated lists of measured state information can be shared.

Information about the measured quantum states that is not a value of one or more of the measured states may be referred to as metadata as described further herein.

FIG. 2B illustrates examples of measured event lists 230 that can be used for some embodiments of a system and method of sharing quantum information using time-correlated single photons of the present teaching. In some embodiments, a detected signal list 232, 234 of all measured photons at a detector as a function of time is generated. A detected signal list 232, 234 could be generated, for example, using the measurements from any one of the detectors 212, 214, 216, 218 described in connection with FIG. 2A. The lists can include measured events that are not associated with a time correlated photon, such as background count measurements. While in general, there is no discernable difference between measured events from correlated and background photons and/or detector dark counts, the lists 232, 234 illustrate time-correlated photons, e.g., event 236 of list 232 and event 238 of list 234 as a dotted line for clarity. Other measured background events from, e.g., background photons and dark counts, are shown with a solid line 240.

Systems using time-correlated photons look for coincidences in time at two different detectors. The background events align in time at different detectors only by chance. For uniform background arrivals with a known rate, it is possible to calculate the probability that these background events align in time. To the extent a reference time exists between nodes and flight and detection time latency from source to detector are taken into account, the arrival time of time correlated photon events 236, 238 in the two lists 232, 234 is the same. Regardless of relative time, time correlated photon arrival events occur with exactly the same time difference (within measurement error) between events if the two clocks run at the same rate. As such, by sliding and comparing the two lists as a function of time, represented by arrow 242, relative time between the two detectors can be determined. By "sliding" we mean comparing the two lists at each of a series of different time shifts between the two lists. By "comparing" we mean adding the number of matches per relative time position of the shift. So together by sliding and comparing we are able to generate a cross-correlation of the two lists.

A peak, with nominally the value of all the time-correlated photons (six in the example) will result at the matched position caused by the sliding, and be lower at other relative time position. The sliding and counting matches at various positions can provide a cross-correlation of the two lists 232, 234. As understood by those skilled in the art, cross-correlation can determine a similarity between two data sets, or two lists of events.

In some methods, coincidence event lists 244, 246 are generated. These may be generated, for example, from the output of the coincidence detector 220 and coincidence detector 222 described in connection with FIG. 2A. In some methods, coincidence lists 244, 246 can be generated by cross correlation and then producing a list of the times of matched events associated with the peak of the correlation. In some methods, only coincidence events from the detector 220 are listed as a function of time. If both a reference time and a clock rate of the two coincidence detectors 220, 222 are synchronized, each list is the same and represents shared information. This method benefits over a case that includes background counts in the shared lists because the lists are reduced to contain only coincidence events, which in many practical systems is several orders of magnitude less than all events. As such, the size of a message containing the list is smaller and/or the amount of data to be processed during analysis of a list is less.

In methods where the reference time and/or clock rate synchronization is unknown, these lists can be shared, and a slide and compare operation, which is represented by arrow 252, can be performed on the coincidence event lists 244, 246 to provide information to synchronize clocks in the two locations. See, for example, U.S. patent application Ser. No. 17/465,235 entitled Method for Synchronizing and Locking Clocks, which presents additional details, applications and systems and methods for sharing quantum information using event lists.

In some methods, coincidence counts 254, 256 are generated. This kind of information about the measured events having no state value information is referred to herein as quantum metadata because this type of metadata is related to quantum state information, but does not contain any actual measured quantum state information. This quantum related metadata can be a number of the coincidence counts in a set time window generated at the output of the coincidence detector 220 and coincidence detector 222, which was described in connection with FIG. 2A. In this case, number 6 shown as 254, and number 6 shown as 256 are generated. These numbers are compared and determined to be equal, which provides a high likelihood that the coincidence events are not in error, for example an error caused by the loss of one or more photons, and the shared information about the coincidences is good information. As such, one feature of the present teaching is that the sharing of a number that has no meaning outside the two systems that are sharing that number, can be used to improve the fidelity of the shared information between the two systems.

Figure 2C:
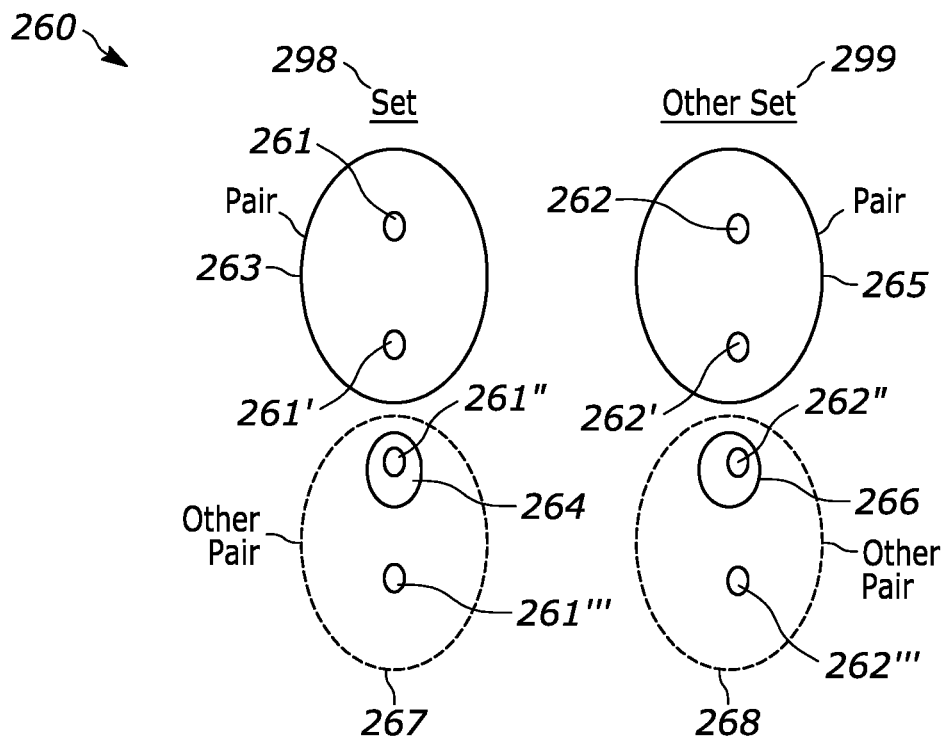
FIG. 2C illustrates a schematic diagram of entangled photon sets for embodiments of a system and method for sharing quantum information using time-correlated single photons of the present teaching.

FIG. 2C illustrates a schematic diagram 260 of entangled photon sets 298, 299 used in embodiments of a system and method for sharing quantum information using time-correlated single photons of the present teaching. The diagram 260 illustrates an example for quadruplets (four) of entangled time-correlated photons, and shows just two sets 298, 299 of quadruplets for clarity. Typically, streams of many entangled photon sets are generated over time. In addition, more, or less, than four photons in a set of entangled photons can be used.

One set 298 of entangled photons includes four photons 261, 261', 261'', 261'''. The set 298 of four photons 261, 261', 261'', 261' is shown aligned vertically to suggest how they are time-correlated, that is they originate at a common time. The other set 299 of entangled photons includes four photons 262, 262', 262'', 262'''. The other set 299 of four photons 262, 262', 262'', 262' is also shown aligned vertically to suggest how the photons 262, 262', 262'', 262' are time-correlated, that is they originate at a common time. The common time for the two sets 298, 299 is different since they are generated at different times. It should be understood that background photons, while commonly present are not shown in the diagram 260 for clarity.

One feature of the present teaching is the recognition that the set 298 of four entangled photons 261, 261', 261'', 261''' are all correlated in time and so one pair 263 of photons 261, 261' of the set 298 of four entangled photons being correlated in time indicates that all four photons 261, 261', 261'', 261' of the set 298 of four entangled photons are entangled. This is an important feature that allows, for example, exploitation of the non-local and/or high precision features of the time correlation that crosses all four photons 261, 261', 261'', 261'''. This is possible because sets 298, 299 of four entangled photons that are time correlated can be determined by coincidence determination of only two photons in the set. For example, coincidence of pair 263, and/or coincidence of pair 267, identify set 298. Likewise, coincidence of pair 265, and/or coincidence of pair 268, identify set 299. This identification then enables the exploitation of some or all of the entangled state information that is carried by the set 298, 299. That is, just determining that a pair is correlated indicates that all four photons are correlated. More generally, determining a subset of photons in an entangled set is correlated necessary indicates another subset, or subsets, of the same set are correlated.

As such, some embodiments of a method of the present teaching determine a coincidence of the one pair 263 of photons of the set 298 of four entangled photons 261, 261', 261'', 261''' and also detect at least one photon 264/261'' that is not in the pair 263 of photons of the set 298 of four entangled photons 261, 261', 261'', 261'. The detection of the one photon 261'' can be, for example, a simple indication that a detection event occurred. The indication may be a mark in a time bin associated with the detection of the photon 261''. The detection can be configured to generate additional state information about the photon 261''. For example, a detection event can include additional measured quantum state information carried by the detected photon, including a precision time of arrival, polarization, wavelength, phase and/or position of the detected photon. This additional state information can be realized, for example, if the quadruplet is hyper-entangled in multiple bases, and the detection event is made appropriately sensitive to the hyper-entangled bases.

By detecting a photon, we mean generally making a measurement of one or more of the quantum states being carried by that photon. An example of detecting is one or more of measuring a time of arrival of a single photon, measuring a polarization of a single photon, measuring a wavelength of a single photon and/or measuring a position of a single photon. Measuring single photons can be done using known single photon detectors, including various photo multiplier devices, avalanche photodiodes, Geiger mode detectors and other single photon detectors. Other state information can be determined in the measurement, for example using various optical analyzers before a single photon detector or detectors. Thus, detecting one or more properties of a single photon can require use of more than one single photon detector. Importantly, a detection of a single photon is a singular measurement event and all properties that are derived from that measurement event are tagged to that particular photon. In this way, a so-called detection of a photon can produce multiple state values.

The method continues by determining that the at least one photon 264 from the other pair 267 of the set of four entangled photons 261, 261', 261'', 261''' is entangled using the coincidence of the one pair 263 of photons of the set 298 of four entangled photons. Thus, the entanglement of the set 298 of four entangled photons is identified from the coincidence of the one pair 263 of photons of the set of four entangled photons.

Stated another way, one aspect of the present teaching is the highly useful concept that knowledge of entanglement of all four photons can be determined from the detection of only two. This capability serves to separate, or make independent, an identification of an entangled set of photons, and other measures of quantum state information of at least some other photons in the set of entangled photons. For example, it is possible that some photons in an entangled set are used to identify the entangled set, and other photons are used to derive or exploit other quantum information of that entangled set. That is, once an entangled state is identified by determining coincidence of pair 263, it is possible to exploit entangled quantum state information that is carried by, for example, the single photon 264 after its measurement or, more generally, any other subset of photons in the set 298.

The identification method can be used, for example, in a system where the determination of the coincidence of pair 263 is used to herald the entangled photon 264 by providing a heralding signal that indicates the presence of a signal photon. The identification can be used, for example, to synchronize a clock that is part of or connected to a system that is determining the coincidence of pair 263 and another clock that is part of or connected to a system that is detecting the photon 264. Numerous synchronization configurations and performance parameters can utilize this method.

The identification method can be used in real time or essentially real time, assuming sufficient attention is given to delays and time-synchronization for both the coincidence determination and the photon measurement/detection. The identification method can also be used in non-real time. In non-real-time systems, measurements are made at one time or over different times, and then subsequently analyzed and/or compared. Time-correlation identification and entangled state information derived from the combination of the coincidence determination and the detected photon 264 are determined and/or exploited at some point after one or both of the measurements are completed. This can be done if the information about the coincidence determination and/or the detection events are kept in lists that represent the measurement events or contain the measurement information that is pertinent to identification. The lists are then subsequently being used for analysis and/or comparison to identify entanglement and/or to determine quantum state information.

In some methods, the pair 263 is sent to one location, measured and processed to determine coincidence in one location and the other photons in the set 298, including at least the detected photon 264, are sent to a different location for the detection. In these cases, the lists containing measured event information that are generated in the two locations can be shared or exchanged, e.g. over a network or other classical communication link.

In general, various lists described in connection with the present teaching, such as, for example, the lists described in connection with FIG. 2B, will contain information about numerous entangled set elements as well as background counts and measurements of photons that are not part of entangled sets.

Key features of the generated lists can be understood by distilling down to just two entangled set elements shown in the diagram 260 of FIG. 2C. The diagram 260 shows the other set 299 of photons 262, 262', 262", 262'" that include a pair 265 of photons 262, 262' and also a single photon 266, photon 262', of the other pair 268 of photons 262", 262'".

Some embodiments of the method of the present teaching generate a set 298 of entangled photons 261, 261', 261", 261'", and then determine a coincidence of one pair 263 of photons 261, 261', and detect one photon 264 of the other pair 267. It is therefore determined by the coincidence event that the detected one photon 264 of the other pair 267 is entangled in the set 298. As such, the determination of coincidence of pair 263, which can potentially be completely independent of the detection event of detected photon 264, identifies that entanglement status. This same process is repeated for the other set 299 of photons 262, 262', 262", 262'". The set 299 is generated, a coincidence of one pair 265 of photons 262, 262' is determined, and a measurement of a photon 266 of the other pair 268 of the set of entangled photons 262, 262', 262", 262'" is performed.

After generation and measurement of both sets 298 and 299 of photons, based on the determined coincidences, a first list of state values corresponding to both the identified set 298 of four entangled photons 261, 261', 261", 261'" and also the identified other set 299 of four entangled photons 262, 262', 262", 262'" is generated. In this simple two-set example, the list can include, for example, two entries that are a determined coincidence time for each set 298, 299. This list can be presented or stored in numerous ways. The list can be marks in regularly spaced time bins that indicate the time-bin corresponding to when the coincidence determination is made. The list can also, or in addition, be presented as timestamps of the coincidence determinations. The list can also, or in addition, be additional state values, such as the difference in arrival time between the two determined coincidences, a polarization value, a wavelength value, a spatial position, or a phase value associated the pairs 263, 265. Lists can also be generated to include measured values of some or all of the individual photons 261, 261', 261", 262, 262', 262" as dictated by the application. The particular content of a list can be based on the application need as well as the specific system and method used for the measurements, detections and coincidence determinations.

One feature of the present teaching is that two, potentially widely geographically separated and/or classically isolated, coincidence determinations of different pairs in a set of entangled photons provide an effectively latency free, or non-local, sharing of quantum information carried by (or contained within) the entangled set. Thus, a determined coincidence of the other pair 267 of photons 261", 261'" of the set 298 of four entangled photons 261, 261', 261", 261'" identifies the entanglement of the set 298 of four entangled photons 261, 261', 261", 261'" and a determined coincidence of the other pair 268 of photons 262", 262'" of the other set 299 of four entangled photons 262, 262', 262", 262'" identifies the entanglement of the other set 299 of four entangled photons 262, 262', 262", 262'". A second list of state values corresponding to both the identified set 298 of four entangled photons 261, 261', 261", 261'" and also the identified other set 299 of four entangled photons 262, 262', 262", 262'" is generated that is based on the determined coincidence of the other pairs 267, 268.

This second list is based on measurements of different pairs than the first list, however, the first list of state values and the second list of state values are correlated. That is, a first list is generated by measurements of pair 263 of photons 261, 261' of one set 298 of entangled photons 261, 261', 261", 261'" and by measurements of pair 265 of photons 262, 262' of the other set 299 of entangled photons 262, 262', 262", 262'". The second list is generated by measurements and coincidence determinations of the other pair 267 of photons 261", 261'" of one set 298 of entangled photons 261, 261', 261", 261'" and by measurements and coincidence determinations of the other pair 268 of photons 262", 262' of the other set 299 of entangled photons 262, 262', 262", 262'".

In some embodiments, these measurements of the detections and coincidence determinations that contribute to the first and second lists are performed in one localized node and/or with one clock providing timing. In other embodiments, these measurements of the detections and determinations are performed in more than one node and/or with more than one clock providing timing. In some embodiments, the lists can be an ordered list of measured state values with no timing information.

Another aspect of the present teaching that has many practical applications is that the first and second lists are correlated even if they are generated by systems that are classically isolated. That is, the two locations of the system do not share classical information, and especially no information that is directly tied to the quantum data that contributed to either list. As such, the two lists share common information without conventional classical means of data exchange between the lists. Only a channel that delivers the entangled photons is needed to achieve the shared information.

As one example of classical isolation, quantum state information related to time of arrivals, or time information derived thereof, can be shared between two systems isolated from all classical time information. For example, two entities performing coincidence determinations on different pairs of an entangled set do not need any classical time information exchanged. Time of arrivals between photons that are part of two different sets are perfectly correlated in two different nodes. As such, the time of arrivals can be used to synchronize the two nodes, even if no classical time information is exchanged.

The classical isolation of distributed nodes executing the method of entanglement identification and information sharing of the present teaching can be complete classical information isolation, meaning that no exchange of any type of classical information is needed to share quantum information. The nodes can also be only partially isolation from classical information. That is, some types of information are shared classically, and other types are not shared classically.

There are many applications where it is desirable for nodes to only be partially isolated from classical information. In some embodiments, the classical information that is included in and exchange can be the quantum metadata as described herein. That is, classical information related to the quantum states, but not specifically the quantum state value information that is considered quantum data. In some embodiments, the classical information that is shared is more ancillary to the quantum system, for example, weather and other situational awareness information.

In some embodiments of the present teaching, it can be desirable to have some classical information exchanged but not others. As one example, some low-precision timing data (e.g. milliseconds or microseconds resolution) can be shared classically, for example to loosely synchronize the nodes, but no precision time data (e.g. nanosecond or picoseconds resolution) is shared classically and yet precision time information is shared based on locally-determined arrival times of entangled photons. In these methods according to the present teaching, separated nodes that do not have shared precision synchronization information available are able to identify entanglement, share quantum state information, and/or synchronize their clocks to high precision.

One feature of the present teaching is that at least some of the quantum information that is shared cannot be known to a third party. As such, the shared information can be considered secret or private. This feature fundamentally comes from the fact that a quantum state is not known until measured, and is carried by single photons.

Figure 2D:
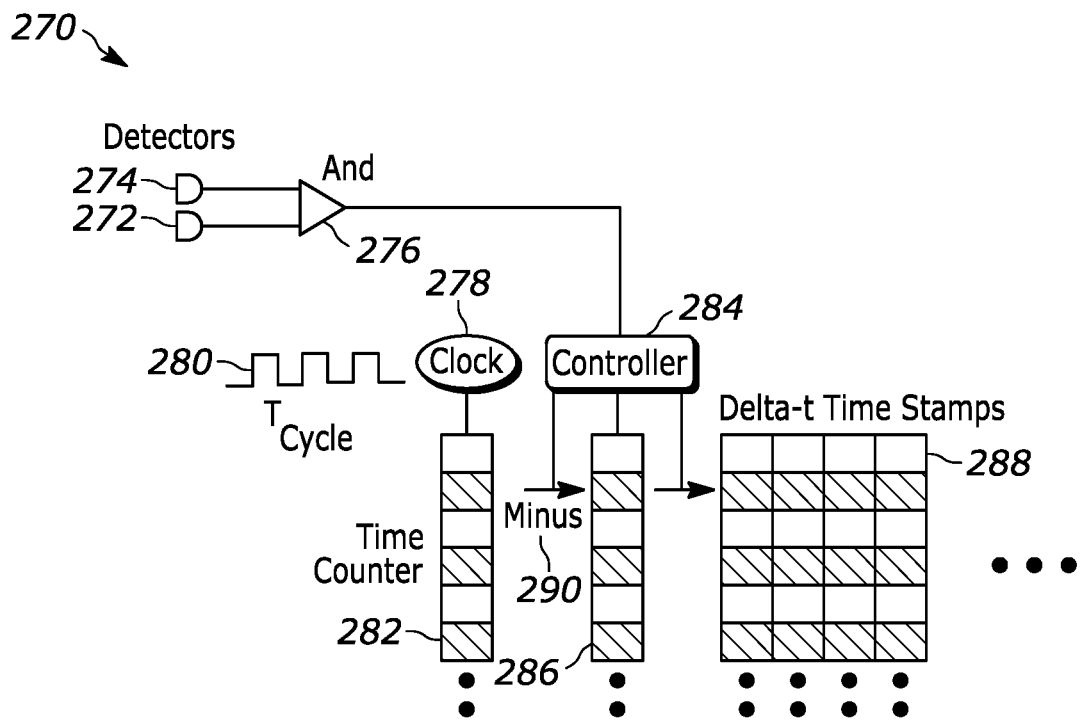
FIG. 2D illustrates an embodiment of a receiver for measuring a pair from time-correlated quadruplets of the present teaching.

Another feature of the present teaching is that the hardware and processing needed to determine coincidence and/or measure state information of photons can be constructed using relatively simple and low-cost components. FIG. 2D illustrates an embodiment of a receiver 270 for measuring a pair from time-correlated quadruplets of the present teaching. The receiver 270 can be used, for example, as an implementation of detectors 212, 214 and coincidence detector 220, and/or an implementation of detectors 216, 218 and coincidence detector 222 as described in connection with FIG. 2A. Detectors 272, 274 generate an electrical signal in response to receipt of time-correlated photons, and may also generate electrical signals in response to background. The detectors can be configured so the electrical signal is high when a photon is detected. The outputs of detectors 272, 274 are input to two inputs of a logical AND gate 276. Time-correlated photons will cause the AND gate 276 to generate a high signal because both inputs are high. A clock 278 in the receiver generates a clock waveform 280 with a cycle time $T_{cycle}$. The clock produces time stamps 282 each cycle. A controller 284 can move a stamp 286 to a buffer 288 when the output of the AND gate 276 is high to store a list of timestamps of coincidences. The controller 284 can determine a difference 290 between time stamps at two high-values from the output of the AND gate 276 to the buffer 288 and a Delta-T timestamp list is generated.

Figure 3A:
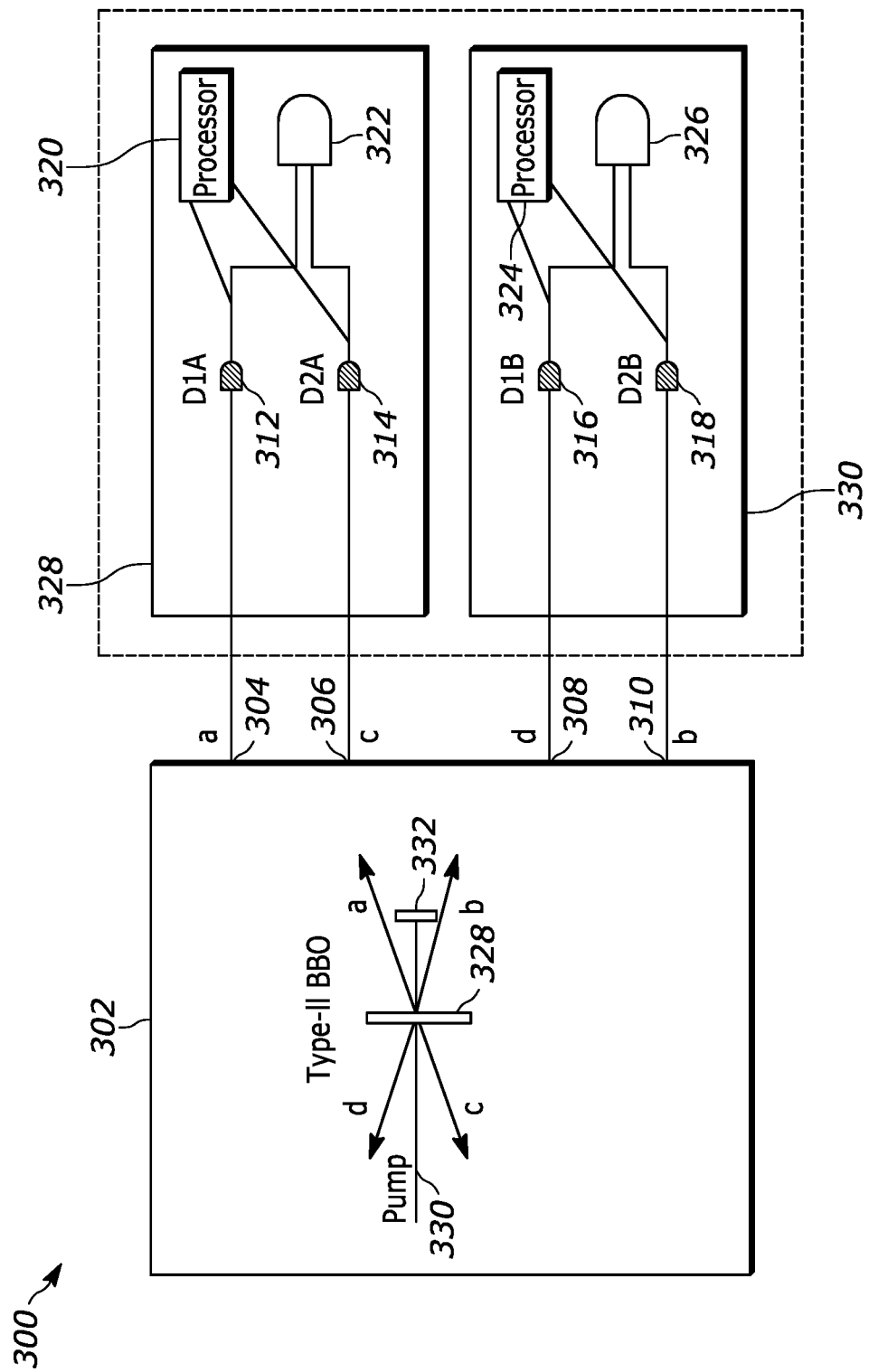
FIG. 3A illustrates an embodiment of a system for sharing quantum information using time-correlated single photons generated by a SPDC source of the present teaching.

Some embodiments of the time-correlated photon identification system of the present teaching use an AND logic gate and processing to determine shared quantum information from time-correlated quadruplets. FIG. 3A illustrates an embodiment of a system 300 for sharing quantum information using time-correlated single photons generated by a SPDC source of the present teaching. The source 302, generates four streams of photons that include at least some time-correlated photons at outputs labeled a 304, b 310, c 306 and d 308. The source 302 can be, for example, the source 100 described in connection with FIG. 1. These outputs are each optically connected to detectors 312, 314, 316, 318. One pair of detectors 312, 314 has outputs connected to a processor 320 and an AND gate 322. Another pair of detectors 316, 318 has outputs connected to a processor 324 and an AND gate 326. The outputs a 304 and c 306 can be optically connected to a node 328 that is physically distinct from a node 330 connected to outputs d 308 and b 310. As described in connection with FIG. 1, a feature of the source 302, is that a coincidence that can be found through the AND operation of the gates 322, 326 in either node 328, 330 has a very high likelihood of indicating a correlated quadruplet of four photons emerging from a 304, c 306 d 308 and b 310.

In some practical embodiments a BBO crystal 328 is energized with a pump laser beam 330 that is reflected back at the BBO crystal 328 by a mirror 332. The resulting output along directions of a, b, c, and d includes various singles, doubles (pairs) and quadruplets that are time correlated photons. The allowed states of this system are as follows: 1) random single photons at arbitrary times at a, b, d, and c; 2) two-way coincidences at a and b only; 3) two-way coincidences at d and c only; and 4) four-way coincidences at a, b, d and c. Excluded states of this system are as follows: 1) two-way coincidence at a and c without a coincidence at d and b; 2) two-way coincidence at b and d without a coincidence at a and c; 3) three-way coincidence at a, c and d without a coincidence at b; 4) three-way coincidence at a, c and b without a coincidence at d; 5) three-way coincidence at d, b and a without a coincidence at c; and 6) three-way coincidence at d, b and c without a coincidence at a.

In this embodiment of the system 300, by carefully choosing the pairings of a, c, d, and b from the source 302, we can guarantee with a high likelihood that if a and c see a coincidence, d and b will see a coincidence.

FIG. 3B illustrates a table of cases for an event list associated an embodiment of the system for sharing quantum information using time-correlated single photons of FIG. 3A. In general, an event is registered either for a random or a time-correlated (marked coincidence) photon to be registered at each of outputs a, b, c and d. Allowed cases are random events at a, b, c and d, coincidences at a and b (entangle pairs), coincidences at c and d (entangle pairs) and coincidences at a, b, c and d (quadruplet). The other cases are not allowed.

FIG. 3C illustrates a table 370 of lost photons and false coincidences for an embodiment of the system for sharing quantum information using time-correlated single photons of FIG. 3A. This table 370 columns refers to detectors described in connection with FIG. 3A. It should be understood that the more likely "error" scenario for a quadruplet is lost photons. That is, although a quadruplet is present at the source outputs a, b, c and d, in the quantum channel to nodes 328, 330 one or more of the entangled photons are lost in the channel on the way to the detector or as a result of imperfections in the detector itself. If detector D1A 312 "looses" a photon, but D1B 316 and D2B 318 do not, the node 330 will assume that it has time-correlated photons and will add the information detected to its ordered list, but node 328 will not, and the ordered lists will no longer match up. But if D2A 314 loses a photon, and D1B 316 loses a photon, neither node 328 or node 330 will add to their ordered list, so no errors are incurred (a detected error) although a time-correlated event is lost. The table 370 outlines when an undetectable error would occur, which is 6/16 possible combinations.

There are various ways to compensate for lost time-correlated events. For example, various methods for compensating for lost time-correlated events include using a classical channel for error detection and/or correction. However, unlike a two-way entangled situation, a classical channel can be used to detect and/or correct these errors with a minimum of information exchange (low bandwidth) for time-correlated quadruplets.

In one method of error correction and/or detection, nodes 328, 330 keep a running count of coincidences and periodically share their numbers through a classical channel. This is a type of parity error checking and correction but does not require the use of an additional signal. In one method, the numbers do not match, the nodes 328, 330 know photons have been missed. The nodes 328, 330 know that the difference between counts equals the number of missed photons, and the detector with the lower number is the one with missing counts. One bandwidth-efficient method to manage this would be to exchange counts at a rate approximately equal to the expected loss rate making the probability of a single lost photon during a counting interval equal to 0.5. If the counts match, the lists match. If they do not, at least one missing photon case is identified.

If there is a missing photon, both nodes 328, 330 could purge their lists for the interval since the last matching count exchange. Alternatively, nodes 328, 330 could exchange their counts for half the list, and see if the counters match. If the counters match, then each node tries for three-quarters of the list. If the counters do not match, then each node tries for one-quarter of the list. Successively cutting the remaining list in half, or doubling it, until the counts match, allows identification of additional time-correlated photons that might otherwise be discarded. It should be clear to anyone skilled in the art that any method of subdividing the list, sharing a count, and then further subdividing the list is an efficient way of managing errors with this scheme.

There are other ways to detect and correct errors, with a low information rate classical exchange. For example, the nodes 328, 330 could share polarization values, but keep time of arrival as a shared secret. This is highly valuable given the large state dimension that can be realized with time. For example, time can be measured to very high accuracy, for example, picosecond or higher. As such, a value with many digits of precision can be shared for each measured entangled set as compared with polarization, which may have only two bits of precision. If polarization values do not match, the most likely reason would be a lost photon as described above. Because both these bases are carried by the same entangled photon set, low-bit value polarization values can be used to improve the accuracy of the large number of bit time value sharing.

As another example of a method of detecting and correcting errors, 328 and 330 can share their list of coincidence event time stamps or combs. Any missing coincidences are discarded. As another example of a method of detecting and correcting errors, quantum metadata that is wavefunction data that indicates particular time windows where entangled photons are not generated is used to discard any measured state values that are found in that window. This can be achieved, for example, by including a metadata collector (not shown) that generates a "high" signal during time windows were single photons are generated, and a "low" signal otherwise. Taking this metadata signal and putting it as a third input to one or both of gates 322, 326 can prevent false positives. That is, prevent the use of a coincidence that is not generated by the pump signal, because the low signal from the metadata collector will hold the gate output to a low.

One feature of the present teaching is that it can be easy and cheap to build a local coincidence detector that is very accurate in measuring coincidences in short time windows. This measurement accuracy will drive the error rate due to false entanglement low. The more likely errors in time correlated quadruplets are related to lost photons. If loss is low, it is possible to build a system with no classical channel between nodes 328, 330. If loss is higher, it is possible build error detection and correction schemes that share limited information between processors 320, 324 in nodes 328 3320 that require only a very low information transfer rate, as compared, for example, to systems that exchange information using pairs of time correlated photons only.

The probability of error caused by singles arriving simultaneously (false coincidences) at D1A 312 and D2A 314 or D1B 316 and D2B 318 is limited by the speed of the local coincidence detector which effectively determines the equivalent resolution of time stamps or size of time bins. The exact formulas have been derived for pairs, see, for example, U.S. patent application Ser. No. 17/465,235, entitled "Method for Synchronizing and Locking Clocks". Low cost, high speed AND logic gates which can be used to detect coincidence are widely available, for example, the 74VHCT08A from Fairchild Semiconductor is specified to run at 5 ns and costs $0.10. With a 5 ns window, the expected value of a false coincidences per second (false entanglement) in a system generating 10,000 singles per second is given by:

$$10{,}000 * \left(\frac{10{,}000}{1/(5*10^{-9})}\right)^2 = 2.5 * 10^{-5}.$$

When two detectors are co-located, a simple logical AND condition can determine coincidences with high time resolution. When the two detectors are remote from each other, we can exchange a quantum state comb over a classical channel to find coincidences. A quantum state comb (hereinafter "comb") is an ordered list of measurement events. That is, a comb is a list of measured states in the order they arrive at a measurement node and/or a particular detector or group of detectors in the measurement node. A comb can also be an ordered list of measured events from different spatial positions. Also, a comb can be an ordered list of measured events from different polarizations or from different colors. Also, combs can be a combination of measured events that include any combination of the above and any other type measured events. The comb time can be measured from various bases, such as a local clock, which can be synchronized in a relative and/or absolute basis to a non-local clock. The local clock can be a free running clock that is synchronized using shared entanglement via methods described herein. It should be understood that a comb can include more than one value per measured state. The value can be, for example, polarization, arrival time, frequency/color and/or spatial position. This is the case, for example, if an entangled state is a hyper-entangled state, where a single photon of a pair or set is entangled in more than one way (dimension or basis). In some embodiments, different members of a comb have different values. That is, a comb can include more than one type of entangled state where the more than one types are not entangled with each other. This could be the case, for example, if quantum states from two different sources generating entangled states were multiplexed. This could be done, for example, to increase the rate of entangled pairs being generated.

Determining coincidences requires exchanging information that includes singles and coincidences then sliding the combs past each other to find the maximum number of overlaps (e.g. cross correlation). Since many practical entanglement sources produce singles at a rate that is three or four orders of magnitude greater than the coincidence rate, a large amount of information must be exchanged and processed, most of which consists of background noise in the form of singles.

For example, if a given source has a singles rate of five thousand per second, and a coincidence rate of ten photons per second, then five-thousand-ten events must be exchanged over the channel per second of data collection. Subsequent processing involves sliding the two combs past each other as described above. That process requires a number of comparison steps that is equal to the 1/(time resolution)×(2×the clock uncertainty between the two detectors). As an example, if the time resolution was 10 ns, and the clock uncertainty was 100 microseconds, the step count would be 1/10 ns×2×100 ms=20 Million comparison steps. By contrast, if only coincidence information is exchanged, the step count would be eleven.

Figure 3D:
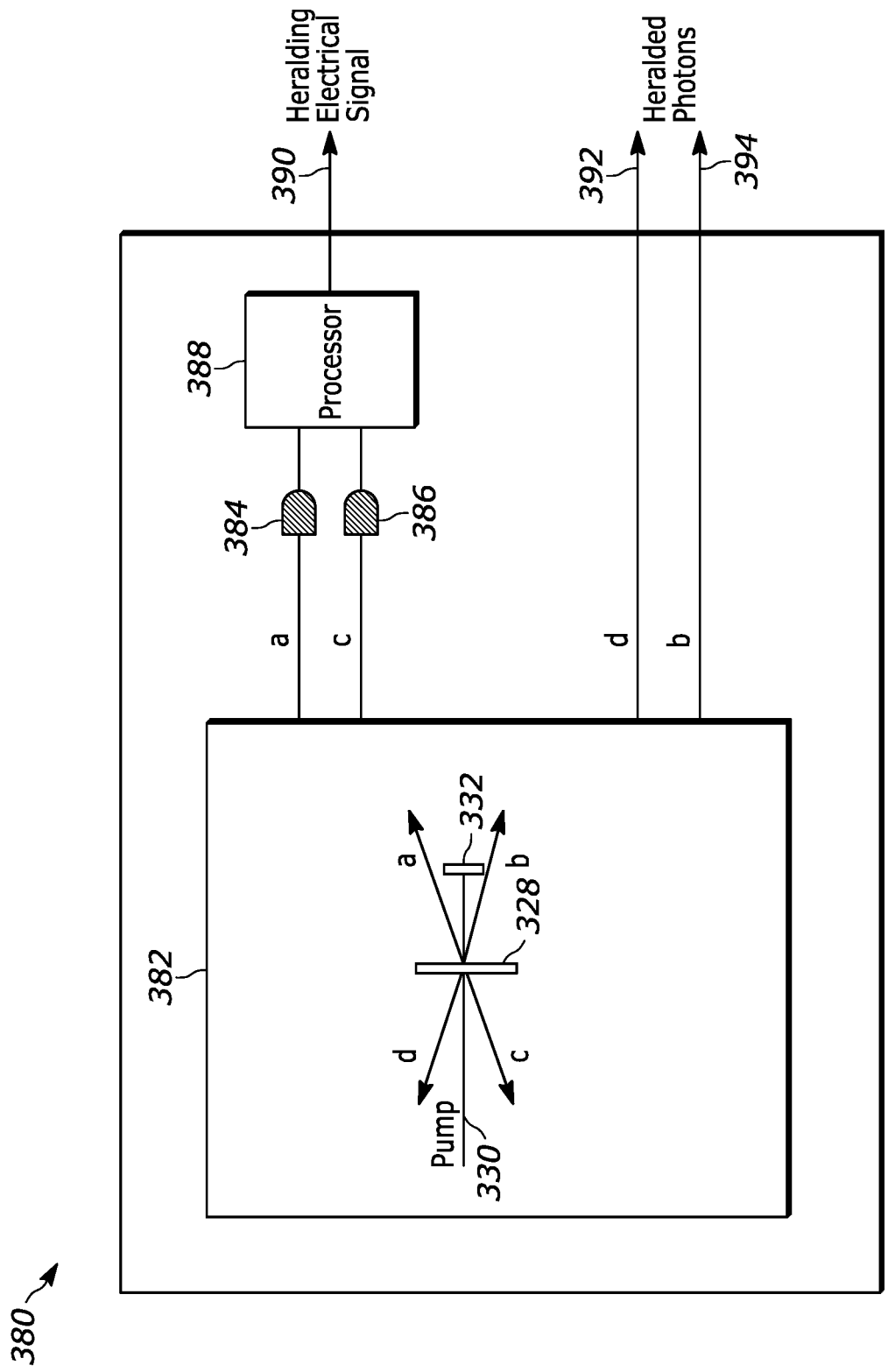
FIG. 3D illustrates an embodiment of a time-correlated quantum state identification system of the present teaching configured as a heralded source.

FIG. 3D illustrates an embodiment of a time-correlated quantum state identification system of the present teaching configured as a heralded source 380. In this embodiment, a source 382 generates four streams of sets of entangled photons that include at least some time-correlated photons at outputs a, b, c, and d. In some embodiments, the source 382 generates any number of entangled and/or correlated photons ranging from three or more. The source 382 can be the same as source 302 described in connection with FIG. 3A and includes a pump 330, nonlinear crystal 328, and reflective element 332. Two of the set of photons, emerging, for example, at a and c, are detected by detectors 384, 386 that have outputs connected to processor 388 that can determine coincidences of photon arrivals at the detectors 384, 386. The other two photons of the set emerge at ports d and b in their optical, coherent, quantum state. These photons can be used downstream in numerous ways as, for example, entangled pairs of photons carrying state information in one or more bases. This can include use in embodiments described herein, and also in other known quantum systems.

The processor 388 generates a signal in response to the coincidences that indicates the presence of a coincidence and can also include a timestamp of the coincidence. Thus, the processor generates a signal that heralds the presence of an entangled set at its optical output ports. The signal can be an analog electrical signal in some configurations. In some embodiments the heralding signal is configured as an electrical trigger signal that can be used to trigger a measurement of other entangled photons in the set. In some embodiments, the heralding signal includes timestamps or other timing information corresponding to the correlated photons. As understood by those skilled in the art, the herald signal can be used locally and/or transmitted by classical means to accompany the correlated photons that remain in a quantum state until detection.

Thus, the heralded source 380 produces from the source 382 of entangled photon sets an electrical herald signal at an output 390 as well as a pair of entangled photons at one or two outputs 392, 394 such that the electrical herald signal can be used to identify the entangled pair by a system connected to the heralded source 382.

A feature of the present teaching is the recognition that a pair of correlated photons from a set can be measured to provide a classical herald signal for the one or more photons that are also in the set. The herald signal and corresponding photons can then be efficiently used by a downstream application, because the herald signal identifies the correlated entangled resource that is still in a quantum state. The embodiment of FIG. 3D illustrates a set of four photons, thereby yielding a source where the herald signal indicates a pair of entangled photons at one or two outputs. However, numerous other configurations can be used, including time-correlated-set source outputs with one, two, three, or more entangled and coherent photons at the output or outputs. Other configurations can use coincidence measurements of more than two photons from the source, for example, to improve the fidelity of the heralding signal.

Figure 4:
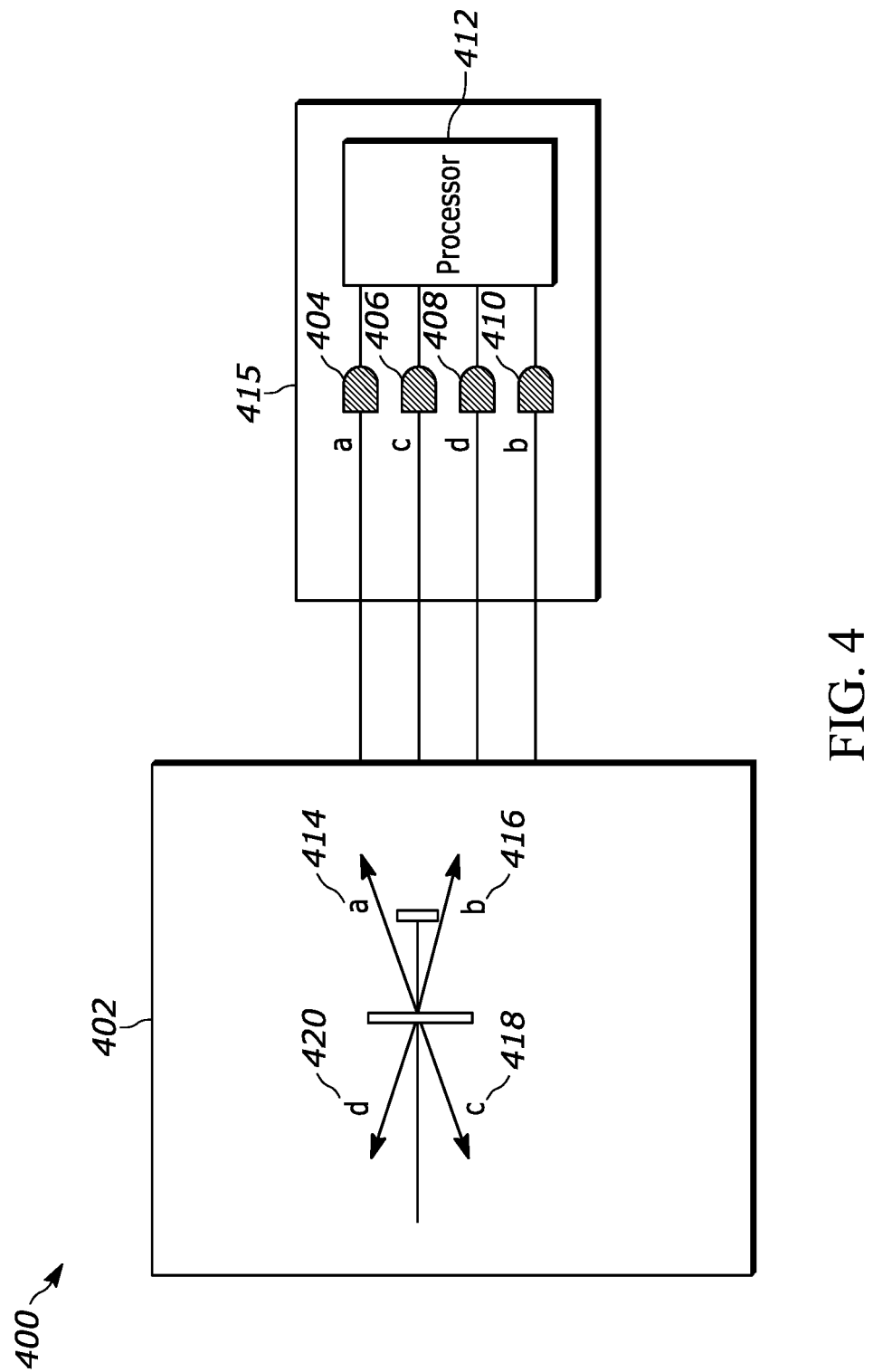
FIG. 4 illustrates an embodiment of a system for sharing quantum information within a single node using time-correlated quadruplet identification of the present teaching.

FIG. 4 illustrates an embodiment of a system 400 for sharing quantum information within a single node 415 using time-correlated quadruplets of the present teaching. The source 402, generates four streams of photons that include at least some time-correlated photons at four outputs that are optically coupled to four detectors 404, 406, 408, 410. The four detectors 404, 406, 408, 410 each generate an electrical signal at an output in response to receiving a photon generated by the source 402. The outputs of each of the detectors 404, 406, 408, 410 are connected to a processor 412. In this embodiment, the detectors 404, 406, 408, 410 and the processor 412 are physically positioned in a node 415. The teaching is not limited to a particular type of node 415, but generally the node is configured to support localized, low-latency, information exchange and control over positions and time-of flight within the node 415. The source 402 can be, for example, the source 100 described in connection with FIG. 1, but can be any photon source that generates time-correlated photons. Each of the four detectors 404, 406, 408, 410 is connected to one of the four outputs from directions a 414, b 416, c 418 and d 420.

In this embodiment, the table 350 described in connection with FIG. 3B lists allowed conditions for event detections at the four detectors 404, 406, 408, 410. A feature of this system 400 configuration, with all detectors co-located, is that it is easy to provide basic synchronization between the four detectors 404, 406, 408, 410. As such, the fine-grain, high resolution time correlation of the quadruplets can be easily exploited. The processor 412 can include one or more logical AND gates or software to provide the logical functions. The AND gates produce a "high" signal when both input signals at the input are "high" and produces a "low" signal otherwise. Thus, coincident detections at any pair of detectors produce a "high" signal at both detectors' outputs. When these outputs are connected to two inputs of an AND gate a "high" output is produced at that AND gate, which is synonymous with the detection.

For example, two detectors 404, 406 can be connected to an AND gate in processor 412 and the other two detectors 408, 410 connected to a different AND gate. When the outputs of the two AND gates are both high because photons are present at all four detectors 404, 406, 408, 410, a time-correlated quadruplet is identified. This assumes equal time-of-flight from source to detectors and through AND gate outputs. It is understood that unequal times of flight can be addressed in various known ways.

We note that if the outputs of the two AND gates are provided to another AND gate, when that third AND gate is high, it correctly identifies the presence of a time-correlated quadruplet. This is true regardless of which pairs of detectors 404, 406, 408, 410 are connected to the AND gates. By putting outputs from detectors coupled to a front side (a or b) and a backside (d or c) into the same AND gate, it reduces the number of AND gate high counts, because the probability of singles appearing at the same time from the front and back directions is low. This can reduce the number of false identifications of time-correlated quadruplets based on a single AND gate connected to just two detectors being high. In some embodiments, this eliminates the need for a third AND gate to identify a time correlated quadruplet.

For the embodiment associated with quantum information sharing system 400 of the present teaching it is also possible to use quantum metadata that is wavefunction data that indicates particular time windows where entangled photons are not generated. During those windows, any measured state values that are found can be discarded. This can be achieved, for example, by including a metadata collector (not shown) that generates a "high" signal during time windows were single photons are generated, and a "low" signal otherwise. Taking this metadata signal and putting it into an AND gate into processor 412 with any or all of the inputs from detectors 404, 406, 408, 410 can prevent false positives. That is, prevent the use of a single photon that is not generated by the pump signal.

Figure 5:
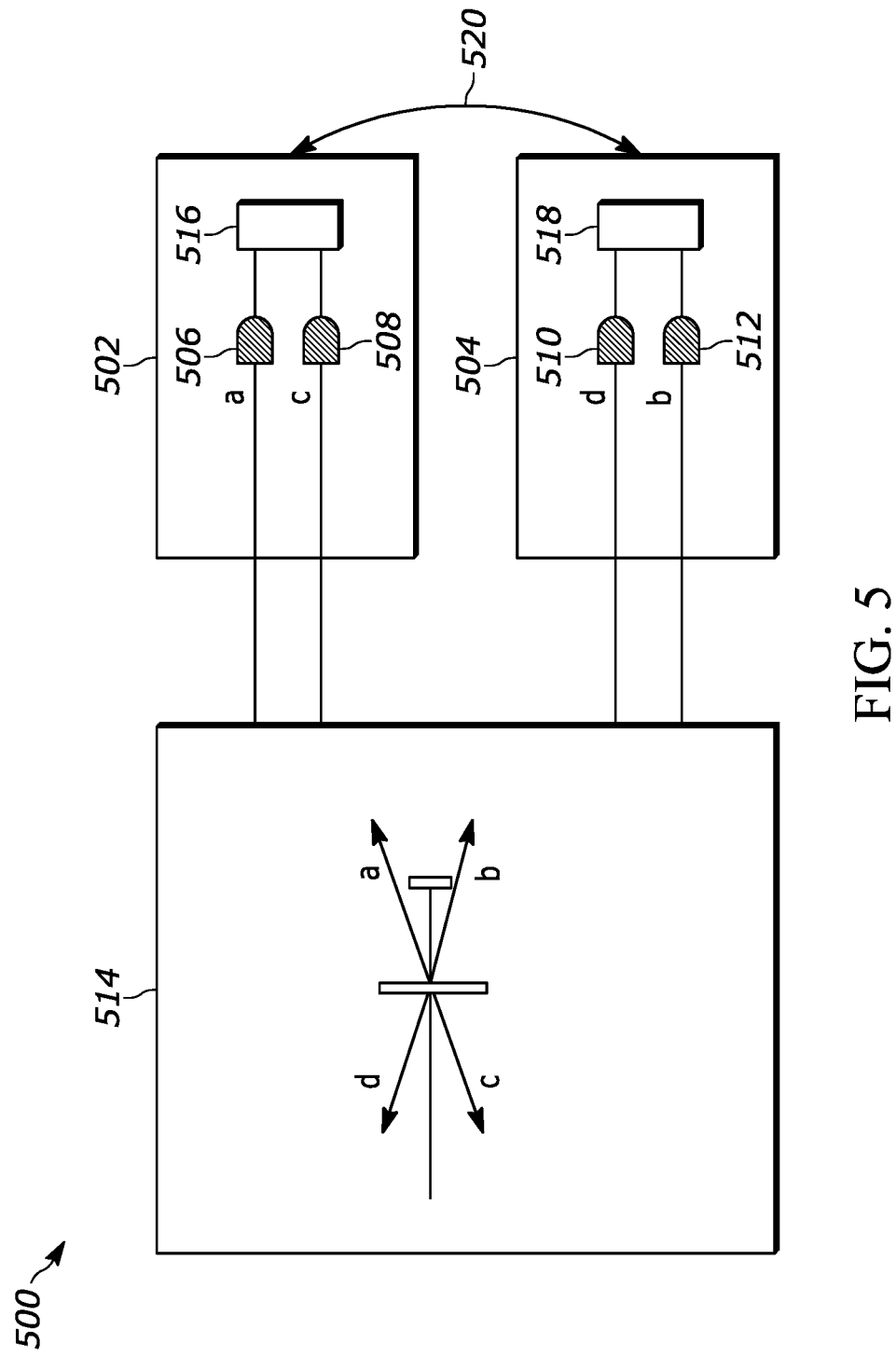
FIG. 5 illustrates an embodiment of a system for sharing quantum information across two nodes using time correlated quadruplet identification of the present teaching.

FIG. 5 illustrates an embodiment of a system 500 for sharing quantum information across two nodes 502, 504 using time correlated quadruplet identification of the present teaching. In this case, the detectors 506, 508, 510, 512 are collocated in pairs in the nodes 502, 504. This embodiment of system 500 highlights features of distributed nodes, including, for example, nodes that are connected by a communication channel 520, for example, public and/or private networks and/or links. In some embodiments, the operation of the system 500 is possible with essentially no requirement for network or link performance of the channel 520, including, for example, latency, arrival order, capacity, speed, synchronization, and other performance parameters.

Pairs are chosen such that if the source 514 produces a 2-way coincidence at one node 502 there is always a 4-way coincidence that includes the pair at the other node 504. Similarly, if the source 514 produces a 2-way coincidence at one node 504, there will be a 4-way coincidence that includes the pair at the other node 502. If no photons are lost between the source 514 and the detectors 506, 508, 510, 512, no exchange of additional information is required over the classical channel, and no additional processing is required at either node to identify entanglement. That is, a list of coincidence times in each node 502, 504 will have an exact 1:1 correspondence because detectors 506, 508, 510, 512 in both nodes 502, 504 detect coincidences locally at the same time, when they measure time-correlated quadruplets generated by the source 514.

The output of detectors 506, 508 is connected to a processor 516 in one node 502. The processor 516 is configured to determine coincidences of detected photons in the detectors 506, 508. The output of detectors 510, 512 is connected to a processor 518 in the other node 504. The processor 518 is configured to determine coincidences of detected photons in the detectors 510, 512. The two processors 516, 518 can also generate a variety of lists of measurement events list based on the output of the detectors 506, 508, 510, 512. For example, a generated event measurement list can be ordered list of measurement events. The list of measured events can be the combs described above in connection with FIG. 3C. For example, the list of measurement events can be ordered as a function of time. The list of measurement events can comprise a sequence of arrivals of single photons based on the time of detection of photons at one or more detector 506, 508, 510, 512. For example, the list of measurement events generated by processor 516 can be ordered times of coincidences measured by detectors 506, 508, which may be referred to as a coincidence list. The coincidences can be determined using an AND logic gate having one input connected to the output of detector 506 and one input connected to the output of detector 508. For example, the list of measurement events generated by processor 518 can be ordered times of coincidences measured by detectors 510, 512. Various lists can be shared using a connection 520 between the nodes 502, 504, for example, a free space or wired link or some type of network connection. The sharing of lists (or more generally any classical information) requires or results in a time-of-flight communication latency that depends on the channel that connects the nodes 502, 504. As understood by those skilled in the art, the latency of communication between two nodes can have numerous contributions, including electromagnetic signal propagation (time of flight), router delays (as would be present in an Internet connection), as well as capacity restrictions and/or processing on either side of the channel. We generally refer to this as a classical communication latency. Although the actual value of this classical communication latency will change depending on the system, a characteristic of some embodiments of the system and method of the present teaching is that it is possible to identify a shared correlated quantum value in the two locations without requiring or realizing this latency, which is a substantial advantage for many applications.

If one photon of the quadruplet is lost, then coincidence lists generated in the nodes 502, 504 will get out of synchronization because one location will miss a coincidence associated with a time-correlated quadruplet that the other location identifies. In various embodiments, the nodes 502, 504 can detect and remove these errors. One embodiment is to have the processors 516, 518 in the two nodes 502, 504 exchange the count of coincidences over a predefined time interval. If the counts agree, the nodes 502, 504 can be assured their respective coincidence list have the exact 1:1 correspondence. If not, the coincidences in the time interval can be discarded. The cadence of this exchange can be set to match the probability of photon loss.

Alternatively, if the counts do not match, some of the matches may still be at least partially verified and usable to provide useful information. The time interval can be halved, and the counts compared again. If they match, we know that the coincidences during that half of the interval have a 1:1 correspondence. If they do not match, the halving can be repeated until the numbers match, and both nodes 502, 504 can be assured this identified subset has a 1:1 correspondence. In this case, the total information exchanged over the connection 520 is simply the number of coincidences. The number of bits required for this exchange over the connection 520 is $\log_2$ (coincidence count).

Alternatively, the nodes 502, 504 can exchange coincidence combs over connection channel 520. In comparison to systems that use only pairs, not quadruplets, the coincidence combs are extremely sparse. As an example, a system with 5000 background singles per second and 10 coincidences, would only require the exchange of combs as described herein with 10 events rather than 5010 events in a system that uses pairs.

Subsequent processing is also greatly simplified. As one example, the difference between arrival times (delta-t) between events can be compared. In the example above, only 10 delta-t's are required. This technique also easily identifies lost photons, as it may require two intervals to bridge the time gap between the arrival of photons at a node 502, and only one for the other node 504. The number of comparisons is approximately equal to the coincidence count.

One feature of the present teaching is that numerous applications can use the results of the quantum information sharing across distributed nodes using time-correlated quadruplets of the present teaching. For example, systems can share a secret based on matched values of arrival time of coincident photons without sharing any timing information over classical communications. Systems can correct lost photon errors with a minimum of classical communications. Systems can also synchronize clocks with a minimum of classical communications by comparing the time on a local clock when coincidences are identified.

Figure 6:
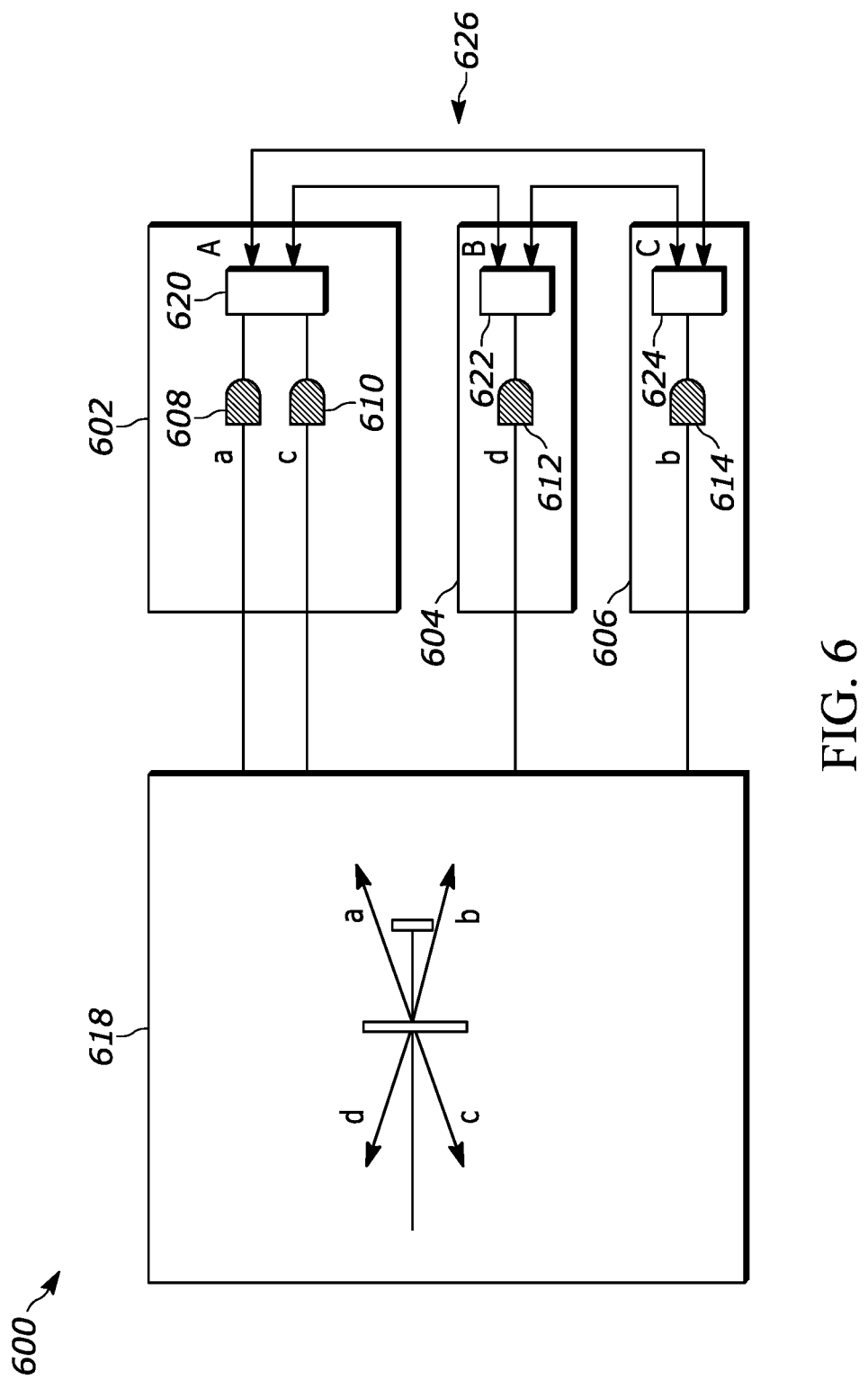
FIG. 6 illustrates an embodiment of a system for sharing quantum information across three nodes using time correlated quadruplet identification of the present teaching.

FIG. 6 illustrates an embodiment of a system 600 for sharing quantum information across three nodes 602, 604, 606 using time correlated quadruplet identification of the present teaching. In this embodiment, two detectors 608, 610 are paired in a node 602 at one location. A detector 612 is at a node 604 at another location, and a detector 614 is positioned in a node 606 at a third location. A source 618 generates time correlated quadruplets that are sent to the nodes 602, 604, 606. The pair of detectors 608, 610 are connected to a processor in node 602. Detector 612 is connected to a processor 622 in another node 604, and detector 604 is connected to a processor 624 in node 606. The processors 620, 622, 624 can be fully connected using connection channels 626. The connection channels 626 could be numerous kinds of connections including, for example, wired and wireless links and/or networks and combinations thereof.

The paired detectors 608, 610 in node 602 identify the coincidences. The processor 620 determines coincidences of photons that are part of quadruplets generated by source 618 and detected at detectors 608, 610. The processor 620 generates combs as a list of measurement events that is an ordered list of arrival times of coincident events. The processor 620 connected to paired detectors 608, 610 sends the ordered list of arrival times of coincident events to the nodes 604, 606. This type of comb or ordered list of arrival times is a type of sparse comb, which is a comb that only includes coincidences, rather than including all measured photon and/or background events.

In some embodiments, the processors 622, 624 connected to remote detectors 612, 614 in nodes 604, 606 generate combs, or list of measurement events of all photon arrivals, including both background singles and coincidences. The processors 622, 624 can slide the sparse comb from the pair node 602 against their locally generated combs to find a best match. In these embodiments, the information exchange over the connections 626 is limited to the list of measured coincidences detected by detectors 608, 610 and generated by processor 620 in node 602.

Thus, in some embodiments, two detectors 608, 610 that are paired in a location are used to determine coincidences locally. Then, the other two detectors 612, 614, that are not paired in a location, but rather are remote, can use time stamps generated in the coincidence of the detector pair 608, 610 that are paired in a location, e.g. node 602, to find entanglement. In these embodiments, the amount of classical data exchange required to share lists is very small.

For example, consider the following, the two detectors 608, 610 that are paired in a node 602 see a coincidence and time stamp it. For example, the detectors 608, 610 are seeing coincidences at a rate of once a second. The other, remote, detectors 612, 614 that are not paired receive a coincidence comb (an ordered list of coincidence arrival times) generated by processor 620 connected to outputs of the two detectors 608, 610 that are paired. That comb only includes time stamps for coincidences. The remote node 604, 606 processors 622, 624 then slide the received coincidence comb against their own locally generated combs to find the three- and then the four-way coincidences. These data shared between nodes 602, 604, 606 over the channel 626 are the time of coincidences, no need to share the background singles arrival times that are detected by detectors 608, 610. Because the background single counts can be two or three orders of magnitude or more plentiful in some environments, the amount of information sent around as part of the list is reduced.

It is possible to determine a probability of error in determination of four-way coincidences (i.e. identification of a quadruplet). The probability of an error is the probability of the time between two singles being equal to the time between two entangled arrivals. For example, if the time stamp accuracy is 100 ns, there are an average of 10 million time slots between entangled events. Singles occur randomly with, by way of example, an average rate of 1000/second. This corresponds to an average of one every 10,000 time slots. The probability of a background single ending up in the any of the same time slots as coincidences is 1/10 M. In the 1000 opportunities in a second, that is an error of 1,000/10 M=1/10,000. As such, to have a delta-t with singles, the same as coincidences requires two of these which are independent. So the probability is the square: $(1/10,000)^2 = 1/100$ M.

In some embodiments, it is possible to wait for three or four real coincidences from the detector pair looking locally in node 602, and match that comb. Then, the probability becomes extremely unlikely. As such, there is a way to use quadruplets across three distributed nodes to share random arrival information without sending time. This is because a node 602 with a pair of detectors 608, 610 can easily identify coincidences locally, and send an extremely sparse comb to the remote nodes 604, 606 over a classical channel 626. The remote nodes 604, 606 are able to determine the four-way entanglement. The comb processing is performed by the processors 622, 624 in the remote nodes 604, 606.

One feature of the present teaching is that compared to systems that use pairs of time-entangled photons to share quantum information, systems of the present teaching that use entangled sets of photons that are time-correlated quadruplets to share quantum information can do so with less information exchange and/or lower computation requirements for identifying matches across different nodes. As described in U.S. patent application Ser. No. 17/306,850, using only entangled pairs requires exchange between nodes of time of arrival data of single photons that include both background singles and coincident singles. This can be about 1,000 times or more the amount of information for sharing in quadruplet systems, which only exchange coincidences. The amount of computation required to find matches by comparing exchanged lists in a pair-only system is proportional to twice the clock uncertainty divided by the time resolution.

One feature is that the classical information exchange required to share coincidence time information using quadruplets with one pair sent to one node and the other pair sent to another node is zero if there is no photon loss. Another feature is that there is also no need for computation for matching, because quadruplet coincidences are effectively heralded by the pair coincidence. Accounting for photon loss requires that the number of coincidences be exchanged. Coincidence counts can be processed to find lost photon conditions. For systems that send on pair of a quadruplet to one node, and one photon to a second node and the fourth photon to a third node, the communications to share arrival time information entails sharing a sparse comb of coincidences. That is, all the background single time stamps are not included in the classical information exchange. The remote detectors require a similar computation of the pair-wise case that is proportional to twice the clock uncertainty divided by the time resolution because their local combs include background singles.

The system and method of the present teaching for identifying entangled states benefits by selectively sharing and processing different quantum metadata and quantum data. By being selective about what information is kept locally, and what information is shared, correlated numbers and/or correlated data sets can be realized with a desired accuracy, a desired error probability, a low processing burden and/or a low latency.

FIG. 7 illustrates a table 700 that compares different configurations of systems for determining correlated data using time-correlated photons of the present teaching. The system configuration, including where the photons are sent, and how they are measured and processed, as well as the characteristics of the photon generation, transport and detection, including the number of non-correlated singles, background counts and photons lost from source to detector, affect the need for classical communication and processing to produce a correlated set of data, or shared correlated number. This table 700 addresses the classical information sharing needed to determine the correlated quantum information that is shared using the time-correlated photons.

Correlated quantum information can include, for example, arrival times of photons, arrival times of coincidences, values of basis states including polarization, wavelength, position or phase, or combinations of these as depends on the configuration of the measurement system. A correlated quantum data set is a collection of this information derived from multiple quadruplets. One specific example of a correlated quantum data set is an ordered list of coincidence time stamps. Two nodes with these ordered lists could have, for example, strongly matching timestamp values if their local clocks used to stamp time are well synchronized. If the clocks are not synchronized or partially synchronized, known techniques and protocols can be used to synchronize the clocks using the correlated quantum data sets. In this case, these clocks can be synchronized without exchanging time information, or any data that might be used to derive that time information.

In general, as the amount of classical information being passed between locations that are sharing correlated quantum data is increased, the latency of classical data transfer is increased, the security or privacy is decreased, the required classical communications channel capacity is increased and the processing time of the classical data to derive the correlated data can also be increased. The table 700 is arranged such that moving from the top row configuration toward the bottom row configuration requires an increasing amount of classical information transfer to produce a shared correlated data set with an acceptable level of error.

The top row of the table 700 describes an embodiment such as that described in connection with FIG. 5. Because the use of coincidence of the pairs naturally avoids the impact of non-correlated single photon counts or background counts, the primary error mechanism is from the loss of photons from source to detector. If this loss is acceptable, meaning that the application layer can deal with any errors arising from a lost photon in the sets, then a measured value, for example an arrival time of the coincidence, or a value of a polarization of one or more of the photons associated with the coincidence is immediately considered a shared correlated value. As such, no latency is encountered in accumulating members of a correlated data set. Said another way, a determined first correlated value at a first location that is based on the coincidence at the first location and a determined second correlated value at the second location that is based on the coincidence at the second location are determined such that a latency between the determination of the first correlated value and the determination of the second correlated value is less than a communication latency between the two locations. The security risk is not impacted by any classical information needing to be provided over a communication channel that might be exposed. Known systems that share quantum correlated data do not have this feature, and at least some information is exchanged to identify the correlated data, and therefore these systems have at least one-way communication latency, and also an associated security vulnerability based on the information exchanged.

The second row of the table 700 describes another embodiment such as that described in connection with FIG. 5, but in this case a small photon loss exists between the source and detectors that is not acceptable for the application. Consequently, a means to handle the loss is needed. This is realized by measuring photons, determining coincidences and also counting coincidences at each location. Coincidence counts are exchanged on a regular basis over the classical channel. This system requires only a very small amount of information exchange over the classical channel.

The processing latency is less than known approaches because only counts are exchanged and matched, not a full list of coincidence arrivals. As one example, a block of correlated photons is a nominal number of correlated photon sets that has sufficiently more lossless quadruplets than lossy ones. In SPDC sources, a block can be defined as a time window of a set duration. The number of counts is not deterministic, and so will change from block-to-block, but will be nominally the same. Counts are counted and sent per block. The amount of classical information sent is a count (number of coincidences) in a block, and would be in some cases sent about once each block time. This is a very small amount of information sent classically.

The third row of the table 700 describes another embodiment such as that described in connection with FIG. 5 in which any amount of photon loss can be corrected. In this case, the two pairs of detectors detect photons, determine coincidences, and generate a timing comb of coincidences, or generated a set of coincidence time stamps at each location. This coincidence time data is exchanged over a classical channel. This approach still has less latency than known systems because you are only matching coincidences, therefore reducing processing latency. You do not have to include in the data set measurement points on non-correlated coincidences, so have a smaller amount of information to send. Therefore, this approach requires less communications capacity since you are just exchanging coincidences. There is slightly more security risk because more timing information is provided over the classical channel.

The fourth row of the table 700 describes another embodiment such as that described in connection with FIG. 6. In this case, one node has detectors that receive a pair of photons from a set of four and two other nodes each receive one photon each of the second pair of the set of four. A timing comb or time stamps of coincidences is generated at the node with the pair. This data does not include any measured singles that are not correlated. This classical information is shared with the nodes having single detectors. Those single detector nodes correlate the coincidence times with arrival times of single photons they have measured. Time matches of the received data and the local data indicate which singles they measure are entangled with the pair or coincidences. In contrast, known systems would require sending information that includes non-correlated singles, and also processing that data in the matching algorithm processor. Thus, this approach has a similar security impact as that in the third row. However, as compared to known systems, the processing in information transfer capacity requirements can be significantly reduced.

We note for the configuration described in the fourth row of the table 700, there is a possibility of lost photons at the single detectors. If one photon is lost at the pair detector node, there is no harm done because this quantum data point is just lost and will not produce a match at the single detectors. However, if photons are lost at the single detector locations, then the pair location thinks it has a match and the nodes do not register that match. One way to address this is to provide a return message from the single detector to the pair detector to resolve this lost photon condition. Depending on the probability of the lost photon, that message could be a count (similar to row two) or a coincidence comb (similar to row three).

The fifth row of the table 700 provides a system in which there are four separate nodes that each receive one of the set of correlated photons. For this case, a timing comb or set of timestamps for each photon arrival (and background counts) is built at each detector. These nodes can exchange this data and use a correlation process to identify entangled data. This configuration has the longest latency, requires the most channel capacity, and the most security risk of the other rows on the table.

EQUIVALENTS

While the Applicant's teaching is described in conjunction with various embodiments, it is not intended that the applicant's teaching be limited to such embodiments. On the contrary, the Applicant's teaching encompasses various alternatives, modifications, and equivalents, as will be appreciated by those of skill in the art, which may be made therein without departing from the spirit and scope of the teaching.

What is claimed is:

1. A method for identifying entangled photons, the method comprising:
    a) generating a plurality of sets of four entangled photons such that respective ones of each of the four entangled photons in each set of the plurality of sets of four entangled photons are generated simultaneously, wherein first pairs of photons in each of the plurality of sets of four entangled photons are time correlated indicating that second pairs of photons in a same one of each of the plurality of sets of four entangled photons are time correlated;
    b) determining a coincidence time of a first pair of photons of each of the plurality of sets of four entangled photons and recording the determined coincidence times as a first quantum data set; and
    c) determining a coincidence time of a second pair of photons of each of the plurality of sets of four entangled photons and recording the determined coincidence times as a second quantum data set, wherein the determined coincidence times of the first pair of photons of each of the plurality of sets of four entangled photons is correlated with the determined coincidence times of the second pair of photons of each of the plurality of sets of four entangled photons such that the first quantum data set and the second quantum data set comprise at least some correlated coincidence times.

2. The method of claim 1 further comprising generating a secret key using data from at least one of the first and second quantum data sets.

3. The method of claim 1 further comprising synchronizing a clock associated with the first data set to a clock associated with the second data set using the first and second quantum data sets.

4. The method of claim 1 further comprising generating a random number from data in at least one of the first and second quantum data sets.

5. The method of claim 1 further comprising detecting errors in the identification of entangled photons in the second data set by using a number of coincidences determined in the first data set.

6. The method of claim 1 further comprising arranging the first and second data sets as ordered lists and then comparing the ordered lists to determine a shared time reference.

7. The method of claim 1 wherein the determining the coincidence times of the first pairs of photons of each of the plurality of sets of four entangled photons is performed at a location that is remote from the determining the coincidence times of the second pairs of photons of each of the plurality of sets of four entangled photons.

8. The method of claim 1 further comprising sending the first quantum data set over a classical channel to a location of the second quantum data set.

9. A method for identifying entangled photons, the method comprising:
   a) generating a plurality of sets of four entangled photons such that respective ones of each of the four entangled photons in each set of the plurality of sets of four entangled photons are generated simultaneously and follow respective ones of four paths, wherein one pair of photons of each set in the plurality of sets of four entangled photons are time correlated, thereby indicating that another pair in a same set of four entangled photons are entangled;
   b) determining a coincidence of the one pair of photons of a portion of the plurality of sets of four entangled photons;
   c) counting the determined coincidences of the one pair of the portion of the plurality of sets of four entangled photons and generating a first coincidence count number;
   d) determining a coincidence of the other pair of photons of the portion of the plurality of sets of four entangled photons, wherein the determined coincidence of the one pair of photons of the portion of the plurality of sets of four entangled photons is correlated with the determined coincidence of the other pair of photons of the portion of the plurality of sets of four entangled photons;
   e) counting the determined coincidences of the other pair of the portion of the plurality of sets of four entangled photons and generating a second coincidence count number; and
   f) comparing the first and second generated coincidence count numbers to identify a possible lost photon condition.

10. The method of claim 9 wherein the comparing the first and second generated coincidence count numbers comprises determining if they are equal.

11. The method of claim 9 further comprising counting a portion of the determined coincidences of the one pair of the portion of the plurality of sets of four entangled photons and generating a third coincidence count number, counting a portion of the determined coincidences of the other pair of the portion of the plurality of sets of four entangled photons and generating a fourth coincidence count number and identifying a possible lost photon condition by comparing the third and fourth coincidence count numbers.

12. The method of claim 9 further comprising counting a portion of the determined coincidences of the one pair of the portion of the plurality of sets of four entangled photons and generating a third coincidence count number, counting a portion of the determined coincidences of the other pair of the portion of the plurality of sets of four entangled photons and generating a fourth coincidence count number and generating a secret key using the portion of the determined coincidences of the one pair of the portion of the plurality of sets of four entangled photons if the third and fourth coincidence counts are equal.

13. The method of claim 9 wherein the determining the coincidence of the one pair of photons of the portion of the plurality of sets of four entangled photons is performed at a location that is remote from the determining the coincidence of the other pair of photons of the portion of the plurality of sets of four entangled photons.

14. A system for identifying entangled photons, the system comprising:
   a) an entangled photon source that generates a plurality of sets of four entangled photons at an output such that respective ones of each of the four entangled photons in each set of the plurality of sets of four entangled photons are generated simultaneously, wherein first pairs of photons in each of the plurality of sets of four entangled photons are time correlated indicating that a second pairs of photons in a same one of each of the plurality of sets of four entangled photons are time correlated;
   b) a first coincidence detector having an input optically coupled to the output of the entangled photon source, the first coincidence detector determining coincidence times of a first pair of photons of at least some of the plurality of sets of four entangled photons and generating signals at an output related to determined coincidence times;
   c) a second coincidence detector having an input optically coupled to the output of the entangled photon source, the second coincidence detector determining coincidence times of a second pair of photons of at least some of the plurality of sets of four entangled photons and generating signals at an output related to determined coincidence times; and
   d) at least one processor having an input coupled to the output of the first coincidence detector and an input coupled to the output of the second coincidence detector, the at least one processor recording the determined coincidence times generated by the first coincidence detector as a first quantum data set and recording the determined coincidence times generated by the second coincidence detector as a second quantum data set, wherein the determined coincidence times of the first pair of photons of at least some of the plurality of sets of four entangled photons is correlated with the determined coincidence times of the second pair of photons of at least some of the plurality of sets of four entangled photons such that the first quantum data set and the second quantum data set comprise at least some correlated coincidence times.

15. The system of claim 14 wherein the output of the entangled photon source comprises four output ports, wherein one photon of the first pair of photons in each of the plurality of sets of four entangled photons emerges from a first output port, another photon of the first pair of photons in each of the plurality of sets of four entangled photons emerges from a second output port, one photon of the second pair of photons in the same one of each of the plurality of sets of four entangled photons emerges from a third output port, and another photon of the second pair of photons in the same one of each of the plurality of sets of four entangled photons emerges from a fourth output port.

16. The system of claim 14 wherein the first and second coincidence detectors each comprise first and second optical detectors.

17. The system of claim 14 wherein at least one of the first and second coincidence detectors have an input that is optically coupled to an output of the entangled photon source by free space.

18. The system of claim 14 wherein at least one of the first and second coincidence detectors have an input that is optically coupled to an output of the entangled photon source by an optical waveguide.

19. The system of claim 14 wherein the first processor and the second processor are electrically connected via a classical communication channel.

20. The system of claim 14 further comprising a metadata collector having an input coupled to at least one of an output of the entangled photon source or an output of at least one of the first and second coincidence detectors, and an output coupled to an input of at least one processor.

* * * * *